(12) United States Patent
Kwon et al.

(10) Patent No.: US 10,212,020 B2
(45) Date of Patent: Feb. 19, 2019

(54) APPARATUS AND METHOD FOR SUPERPOSITION TRANSMISSIONS

(71) Applicant: Samsung Electronics Co., Ltd., Gyeonggi-do (KR)

(72) Inventors: Hyukjoon Kwon, San Diego, CA (US); Linbo Li, San Diego, CA (US); Jungwon Lee, San Diego, CA (US); Sandeep Krishnamurthy, Mountain View, CA (US)

(73) Assignee: Samsung Electronics Co., Ltd (KR)

( * ) Notice: Subject to any disclaimer, the term of this patent is extended or adjusted under 35 U.S.C. 154(b) by 161 days.

(21) Appl. No.: 14/997,106

(22) Filed: Jan. 15, 2016

(65) Prior Publication Data

US 2016/0366003 A1 Dec. 15, 2016

Related U.S. Application Data

(60) Provisional application No. 62/173,241, filed on Jun. 9, 2015, provisional application No. 62/203,818, filed
(Continued)

(51) Int. Cl.
*H04L 27/34* (2006.01)
*H04L 27/18* (2006.01)
(Continued)

(52) U.S. Cl.
CPC ........ *H04L 27/3405* (2013.01); *H04L 1/0001* (2013.01); *H04L 1/007* (2013.01);
(Continued)

(58) Field of Classification Search
CPC ... H04L 27/3405; H04L 1/007; H04L 1/0001; H04L 5/003; H04L 27/18; H04L 1/0009;
(Continued)

(56) References Cited

U.S. PATENT DOCUMENTS

| 7,965,793 | B2 | 6/2011 | Golltschek Edler Von Elbwart et al. |
| 8,824,601 | B2 | 9/2014 | Malladi |

(Continued)

OTHER PUBLICATIONS

Yazaki, Takahiro et al., Effect of Joint Detection and Decoding in Non-orthogonal Multiple Access, Copyright 2014 IEEE 2014 IEEE International Symposium on Intelligent Signal Processing and Communication Systems (ISPACS) Dec. 1-4, 2014, pp. 245-250.
(Continued)

*Primary Examiner* — Joshua Kading
*Assistant Examiner* — Lalita W Pace
(74) *Attorney, Agent, or Firm* — The Farrell Law Firm, P.C.

(57) ABSTRACT

Apparatuses, systems, and methods are described concerning a new type of superposition multiplexing transmission constellation (super-constellation): the Gray-mapped Non-uniform-capable Constellation (GNC). Apparatuses, systems, and methods for generating GNC super-constellations are described, as well as apparatuses, systems, and methods for receiving, demapping, and decoding transmissions using GNC super-constellations. Apparatuses, systems, and methods for selecting a type of superposition multiplexing transmission constellation based on various conditions are also described.

20 Claims, 7 Drawing Sheets

Related U.S. Application Data on Aug. 11, 2015, provisional application No. 62/204,305, filed on Aug. 12, 2015, provisional application No. 62/210,326, filed on Aug. 26, 2015.

(51) Int. Cl.
 *H04W 72/04* (2009.01)
 *H04L 5/00* (2006.01)
 *H04L 1/00* (2006.01)

(52) U.S. Cl.
 CPC .............. *H04L 5/003* (2013.01); *H04L 27/18* (2013.01); *H04W 72/0473* (2013.01); *H04L 1/0003* (2013.01); *H04L 1/0009* (2013.01); *H04L 27/3411* (2013.01)

(58) Field of Classification Search
 CPC .............. H04L 1/0003; H04L 27/3411; H04W 72/0473
 See application file for complete search history.

(56) References Cited

U.S. PATENT DOCUMENTS

| | | | |
|---|---|---|---|
| 8,908,799 B2* | 12/2014 | Qu | H04L 27/02 375/298 |
| 9,042,476 B2 | 5/2015 | Krishnamurthy | |
| 2012/0294290 A1* | 11/2012 | Mitchell | H04L 1/203 370/336 |
| 2015/0139293 A1* | 5/2015 | Stanwood | H04L 27/01 375/230 |
| 2015/0156050 A1 | 6/2015 | Nishimoto et al. | |
| 2016/0036619 A1* | 2/2016 | Yan | H04L 27/3483 370/329 |
| 2017/0317864 A1* | 11/2017 | Yuan | H04L 27/04 |

OTHER PUBLICATIONS

Yang, Shenghao, Superposition Coding for Linear Operator Channels over Finite Fields, Copyright 2012 IEEE, 2012 IEEE Information Theory Workshop, pp. 502-506.
Vanka, S. et al., Superposition Coding Strategies: Design and Experimental Evaluation, Copyright 2012 IEEE IEEE Transactions on Wireless Communications, vol. 11, No. 7, Jul. 2012, pp. 2628-2639.
Vizi, P. et al., Scheduling using Superposition Coding: Design and Software Radio Implementation, Copyright 2011 IEEE, Radio and Wireless Symposium 2011, pp. 154-157.
Sung, Chang Kyung et al., Channel Quantization Using Constellation Based Codebooks for Multiuser MIMO-OFDM, Copyright 2014 IEEE IEEE Transactions on Communications, vol. 62, No. 2, Feb. 2014, pp. 578-589.
Song, Jian et al., Approaching Capacity Region for Two-User GBC With Bit-Division Multiplexing, Copyright 2014 IEEE, IEEE Transactions on Vehicular Technology, vol. 64, No. 7, Jul. 2015, pp. 3311-3316.
Schaepperle, Joerg, Throughput of a Wireless Cell Using Superposition Based Multiple-Access with Non-ideal Interference Cancellation, Copyright 2010 IEEE 2010 IEEE 21st International Symposium on Personal, Indoor and Mobile Radio Communications Workshops, pp. 372-375.
Saito, Keisuke et al., Performance and Design of SIC Receiver for Downlink NOMA With Open-Loop SU-MIMO, Copyright 2015 IEEE IEEE ICC 2015—Workshop on 5G & Beyond—Enabling Technologies and Applications, Jun. 8-12, 2015, pp. 1161-1165.
Saito, Yuya et al., Non-Orthogonal Multiple Access (NOMA) for Cellular Future Radio Access, Copyright 2013 IEEE, pp. 5.
Saito, Keisuke et al., Link-level Performance of Downlink NOMA with SIC Receiver Considering Error Vector Magnitude, Copyright 2015 IEEE, IEEE 81st VTC (May 11-14, 2015), pp. 5.
Nikopour, Hosein et al., SCMA for Downlink Multiple Access of 5G Wireless Networks, Copyright 2014 IEEE Globecom 2014—Wireless Communications Symposium, Dec. 8-12, 2014, pp. 3940-3945.
Lu, Xuanxuan et al., Cooperative Transmission through Signal-Superposition-Based Braid Coding, Copyright 2015 IEEE IEEE Transactions on Vehicular Technology, May 26, 2015, pp. 14.
Lindbom (Ericsson), Lars et al., Enhanced Inter-cell Interference Coordination for Heterogeneous Networks in LTE-Advanced: A Survey, Dec. 7, 2011, pp. 18.
Jin, Huangping et al., On Two-user Degraded GBC with Finite Input Constellations, Copyright 2015 IEEE 2015 IEEE Wireless Communications and Networking Conference (WCNC 2015)—Track 2: MAC and Cross-Layer Design, pp. 1249-1254.
Hojeij, Marie-Rita et al., Resource Allocation in Downlink Non-orthogonal Multiple Access (NOMA) for Future Radio Access, Copyright 2015 IEEE, May 2015, pp. 6.
Khormuji, Majid Nasiri, Generalized Semi-Orthogonal Multiple-Access for Massive MIMO, Copyright 2015 IEEE, May 11, 2015, pp. 5.
Eom, Seungyeon et al., The Simple Near-Optimal Pairing Scheme of Superposition Coding in Downlink DS-CDMA Multi-path Channel, Copyright 2007 IEEE, pp. 1065-1069.
Dai, Xiaoming et al., Successive Interference Cancelation Amenable Multiple Access (SAMA) for Future Wireless Communications, Copyright 2014 IEEE Proceedings of the 2014 IEEE ICCS, pp. 222-226.
Choi, Byonghyok et al., Superposition Coding and Linear Network Coding for Reliable Multicast Over Fading Channels, Copyright 2008 IEEE, pp. 7.
Choi, Jinho, Non-Orthogonal Multiple Access in Downlink Coordinated Two-Point Systems, Copyright 2014 IEEE IEEE Communications Letters, vol. 18, No. 2, Feb. 2014, pp. 313-316.
Ahmed, Ali et al., Compressive Multiplexing of Correlated Signals, Copyright 2014 IEEE, IEEE Transactions on Information Theory, vol. 61, No. 1, Jan. 2015, pp. 479-498.
Choi, Jinho, H-ARQ based Non-Orthogonal Multiple Access with Successive Interference Cancellation, Copyright 2008 IEEE, pp. 5.
3GPP TSG RAN WG1 #80bis, Apr. 20-Apr. 24, 2015, Belgrade, Serbia, Multiuser superposition schemes, pp. 4.
3GPP TSG RAN WG1 Meeting #80bis, Belgrade, Serbia, Apr. 20-24, 2015, Discussion on Multiuser Superposition Schemes, pp. 5.
3GPP TSG RAN WG1 meeting 81, Fukuoka, Japan, May 25-29, 2015, Candidate schemes for superposition transmission, pp. 11.
3GPP TSG RAN WG1#80b, Belgrade, Serbia, Apr. 20-24, 2015, Candidate schemes for superposition transmission, pp. 11.
3GPP TSG RAN WG1 Meeting #81, Fukuoka, Japan, May 25-29, 2015, Discussion on Multiuser Superposition Schemes and Initial Link Level Results, pp. 6.
3GPP TS 36.211 V12.5.0 (Mar. 2015), 3rd Generation Partnership Project; Technical Specification Group Radio Access Network; Evolved Universal Terrestrial Radio Access (E-UTRA); Physical channels and modulation, (Release 12), pp. 136.
3GPP TS 36.212 V12.0.0 (Dec. 2013), 3rd Generation Partnership Project; Technical Specification Group Radio Access Network; Evolved Universal Terrestrial Radio Access (E-UTRA); Multiplexing and channel coding, (Release 12), pp. 87.

* cited by examiner

APPARATUS AND METHOD FOR SUPERPOSITION TRANSMISSIONS

PRIORITY

This application claims priority under 35 U.S.C. § 119(e) to a U.S. Provisional Patent Application filed on Jun. 9, 2015 in the United States Patent and Trademark Office and assigned Ser. No. 62/173,241, a U.S. Provisional Patent Application filed on Aug. 11, 2015 in the United States Patent and Trademark Office and assigned Ser. No. 62/203,818, a U.S. Provisional Patent Application filed on Aug. 12, 2015 in the United States Patent and Trademark Office and assigned Ser. No. 62/204,305, and a U.S. Provisional Patent Application filed on Aug. 26, 2015 in the United States Patent and Trademark Office and assigned Ser. No. 62/210,326, the entire contents of each of which are incorporated herein by reference.

FIELD OF THE DISCLOSURE

The present disclosure relates generally to superposition multiple access communication technologies, and more particularly, to Multi-User Superposition Transmission (MUST) in $3^{rd}$ Generation Partnership Project (3GPP).

BACKGROUND

The adoption of superposition multiple access is a recent development in the $3^{rd}$ Generation Partnership Project (3GPP). See, e.g., Chairman's Notes, 3GPP RAN1 Meeting #80b, Belgrade (2014 Apr. 20). Although often referred to in 3GPP as Multi-User Superposition Transmission (MUST), superposition multiple access techniques has various names and various types, including, and not limited to, Non-Orthogonal Multiple Access (NOMA), Semi-Orthogonal Multiple Access (SOMA), Rate-adaptive constellation Expansion Multiple Access (EMA), Downlink Multiple User (DL MU), etc. The present disclosure is not limited to any of the afore-mentioned technologies, but has wide applicability to any superposition communication technology.

In general, multiple access superposition refers to communicating to multiple users by linearly combining amplitude-weighted, encoded, and/or modulated messages. For example, FIG. 1 has Base Station (BS) 110 (or evolved NodeB (eNB)) and two users (or User Equipments (UEs)), a near UE 120 and a far UE 130 ("near" and "far" referring to their relative distances from BS 110). Both the near UE 120 and the far UE 130 receive the same signal x, comprising symbol $x_n$ for the near UE 120 and symbol $x_F$ for far UE 130, which can be represented by Equation (1):

$$x = \sqrt{\alpha_N} x_n + \sqrt{\alpha_F} x_F \qquad (1)$$

where α generally refers to transmission power, and thus $\alpha_N$ is the transmission power allocated to the near user signal and $\alpha_F$ is the transmission power allocated to the far user, where $\alpha_N + \alpha_F = 1$. Sometimes a refers more generally to the ratio of near user power to far user power, as shown in FIG. 2, which is discussed further below.

Speaking simplistically, near UE 120 decodes symbol $x_F$ for far UE 130 and uses it to cancel $x_F$ as interference, thereby decoding symbol $x_n$ intended for the near UE 120. One reiterative process for this type of cancellation is "Successive Interference Cancellation" or SIC. The far UE 130, on the other hand, simply decodes its own signal $x_F$ (although it is possible for the far user to also perform some form of signal cancellation to eliminate $x_n$).

Generally herein, far user symbol $x_F$ corresponds to $K_F$ bits of data represented as $(d_0^F d_1^F \ldots d_{K_F-1}^F)$ and near user symbol $x_N$ corresponds to $K_N$ bits of data represented as $(d_0^N d_1^N \ldots d_{K_N-1}^N)$.

FIG. 2 shows an example of a "super-constellation" formed of a (QPSK, QPSK) modulation pair under MUST. "(QPSK, QPSK)" means that both the far and near UE signals are modulated by QPSK. FIG. 2 is the result of a direct symbol mapping (DSM) of QPSK using Equation (1) for both the near and far users, i.e., a 16-QAM (Quadrature Amplitude Modulation) super-constellation. Moreover, in FIG. 2, the constituent $x_F$ and $x_n$ symbols are separately Gray encoded.

Each of the four bit symbols in the 16-QAM super-constellation in FIG. 2 comprises two bits for the symbol intended for the far user and two bits of the symbol intended for the near user. More specifically, each four-bit symbol ($b_0$, $b_1$, $b_2$, $b_3$) comprises ($b_0$, $b_1$)=($d_0^F d_1^F$), the two bits for the far user, and ($b_2$, $b_3$)=($d_0^N d_1^N$), the two bits for the near user. Thus, the far user constellation is relatively coarse, because each quadrant represents only one symbol (for example, the upper right quadrant is (00)), while each quadrant of the near user constellation has all four symbols (00, 01, 10, and 11). However, because the near user is nearer, the near user's received signal is stronger and it will be easier for the near user to distinguish that level of detail than the far user.

In theory, having the near user employ Successive Interference Cancellation (SIC) by codeword, where the far user codeword is decoded, the original encoded far user codeword reconstructed using the decoded codeword, and then the reconstructed original signal cancelled from the overall signal prior to decoding, is optimal in the sense that it achieves capacity.

In practice, Code Word Interference Cancellation (CWIC), as described above, is rather difficult because the near user receiver needs to have the far user's transmission parameters, such as, e.g., the codeword Modulation and Coding Scheme (MCS), precoding matrix, rank, power boost, etc. If, for example, the network provided this information it would lead to an increase in control signaling overhead. In addition, the decoding, re-constructing, and cancelling of the far user's codeword leads to a substantial usage of resources.

By contrast, Symbol-Level Interference Cancellation (SLIC) is a low-complexity approach and when joint detection, i.e., Maximum Likelihood (ML) detection, is used, SLIC can approach the performance of CWIC in many scenarios. However, when SLIC is used, the log-likelihood ratio (LLR) distribution of the different bits in both symbols $x_N$ and $x_F$ can affect performance. For example, the direct symbol mapping (DSM) leads to degraded SLIC performance.

SUMMARY

Accordingly, the present disclosure has been made to address at least the problems and/or disadvantages described above and to provide at least the advantages described below.

An aspect of the present disclosure provides a new type of superposition super-constellation, the Gray-mapped Non-uniform Constellation (GNC). According to another aspect of the present disclosure, the spacing between neighboring symbols in the GNC super-constellation can be unequal. According to yet another aspect of the present disclosure, the GNC super-constellation is formed by a direct-sum of regularly spaced lattices, which leads to simplified joint LLR generation. According to another aspect of the present disclosure, GNC can be easily extended for MUST with more than two users (i.e., more than simply a "near" and a "far" user).

According to one aspect of the present disclosure, a method is provided for selecting a superposition constellation including two or more user equipment (UE) constellations, including determining which type of superposition constellation (super-constellation) to generate based at least on a power ratio among the two or more UEs, wherein one type of super-constellation is a Gray-mapped Non-uniform-capable Constellation (GNC), in which both the constituent constellations of the two or more UEs and the GNC super-constellation itself are Gray-mapped; and generating the determined type of superposition constellation.

According to one aspect of the present disclosure, a method is provided for a user equipment (UE) in a communication system capable of superposition multiplexing transmission, including receiving an indication that superposition transmission is being used to transmit to the UE; receiving an indication of which type of superposition transmission is being used to transmit to the UE, wherein at least one type of superposition transmission uses a Gray-mapped Non-uniform-capable Constellation (GNC) super-constellation; receiving one or more superposition transmission parameters; and determining a Log-Likelihood Ratio (LLR) approximation of a received transmission based at least on the type of superposition transmission being used and the one or more superposition transmission parameters.

According to one aspect of the present disclosure, an apparatus for selecting a superposition constellation including two or more user equipment (UE) constellations is provided, including at least one non-transitory computer-readable medium storing instructions capable of execution by a processor, and at least one processor capable of executing instructions stored on the at least one non-transitory computer-readable medium, where the execution of the instructions results in the apparatus performing a method including determining which type of superposition constellation (super-constellation) to generate based at least on a power ratio among the two or more UEs, wherein one type of super-constellation is a Gray-mapped Non-uniform-capable Constellation (GNC), in which both the constituent constellations of the two or more UEs and the GNC super-constellation itself are Gray-mapped; and generating the determined type of superposition constellation.

According to one aspect of the present disclosure, a user equipment (UE) is provided, including at least one non-transitory computer-readable medium storing instructions capable of execution by a processor; and at least one processor capable of executing instructions stored on the at least one non-transitory computer-readable medium, where the execution of the instructions results in the UE performing a method including receiving an indication that superposition transmission is being used to transmit to the UE; receiving an indication of which type of superposition transmission is being used to transmit to the UE, wherein at least one type of superposition transmission uses a Gray-mapped Non-uniform-capable Constellation (GNC) super-constellation; receiving one or more superposition transmission parameters; and determining a Log-Likelihood Ratio (LLR) approximation of a received transmission based at least on the type of superposition transmission being used and the one or more superposition transmission parameters.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
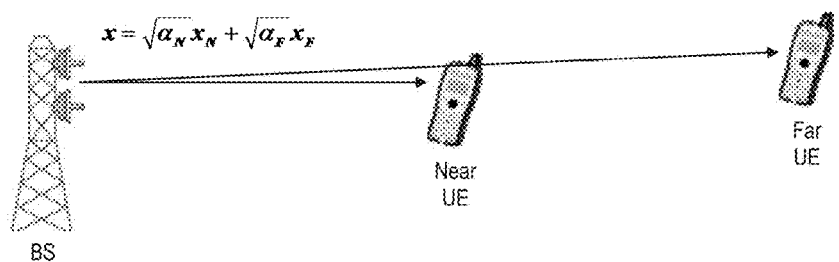
FIG. 1 is a diagram showing an example of Multi-User Superposition Transmission (MUST), with both a near UE and a far UE sharing a superposed signal.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

A related non-provisional patent application by the same inventors, entitled Power Allocation on Gray Mapped Superposition Transmission, is being filed concurrently, and claims priority to the same four U.S. provisional patent applications as does the present application. That application is expressly incorporated by reference in its entirety.

In general, it is preferable for a super-constellation to meet the following three conditions:

(1) the super-constellation is Gray encoded/mapped;

(2) the balance of transmission power a can be arbitrarily set by the BS/eNB (i.e., having a non-uniform super-constellation, where points are g equidistant); and (3) the constellations making up the super-constellation are themselves individually Gray-encoded (this helps in a situation where the far UE has a signal level close to the I+N floor).

The present disclosure describes a new type of super-constellation, a Gray-mapped Non-uniform Constellation (GNC), a super-constellation which is Gray encoded/mapped, allows the BS/eNB to select their own balance of transmission power a among the users (i.e., non-uniform, but still Gray-mapped super-constellations), and ensures the constellations making up the super-constellation are themselves individually Gray-encoded (i.e., in addition to the points of the super-constellation being Gray-mapped). This is discussed in Section I below.

Although named "Gray-mapped Non-uniform Constellation" (GNC), the term "GNC" covers both non-uniform and uniform super-constellations having the desirable characteristics. As such, "GNC" is sometimes also referred to herein as "Gray-mapped Non-uniform-capable Constellation".

GNC is not always the optimal solution. There is an "exclusion" zone where using a GNC super-constellation may provide little or no benefit over other methods of mapping. Moreover, under certain power ratio conditions, better results can be found by "bit-swapping"—reversing the far and near user bits within the GNC—as will be discussed in detail below. Accordingly, another aspect of the present disclosure is to provide methodologies to determine the conditions under which a GNC should be used, when bit-swapping should be used, and when neither is helpful (and other methods may be used). See Sect. II below.

Moreover, another aspect of the present disclosure is to provide symbol detector options for MUST in general, and for bit-swapping GNC-based systems in particular. See Sect. III below. Similarly, yet another aspect of the present disclosure is to provide LLR generation/demapping options for MUST in general, and for bit-swapping GNC-based systems in particular. See Sect. IV below. Lastly, control signalling for MUST in general, and for bit-swapping GNC-based systems in particular, are discussed as still another aspect of the present disclosure. See Sect. V below.

I. Gray-Mapped Non-Uniform Constellation (GNC)

Below, methods for generating a Gray-mapped Non-uniform Constellation (GNC), are discussed, according to various embodiments of the present disclosure. Using this new type of bit-to-symbol mapping, Gray-mapping is ensured on both the user and super level, the spacing between symbols can be unequal, and simplified joint LLR generation can be used because the GNC is formed by a direct-sum of regularly spaced lattices. Moreover, GNC can be easily extended to multiple users (I.e., more than simply a "near" and a "far" user, as in most of the examples herein).

Generally speaking, using the simple example of one near and one far user, where the constellation order of the near user is $N_n$ and the constellation order of the far user is $N_f$, the super/joint constellation is $N_s = N_n * N_f$. For a standard uniform $N_s$-QAM constellation, the real part of the analytical form can be presented as a simplified unit of the repeated nested form, disregarding the factor for power normalization and preceding $(1-2b_0)$ which is multiplied by the repeating nested structure, as shown in Equation (2):

$$\ldots \left[ 2^{\left(\frac{\log_2(N_s)}{2} - k\right)} - (1 - 2b_{2k})[\ \ldots\ ] \right] \quad (2)$$

where $1 \le k \le \frac{\log_2(N_f)}{2} - 1$.

In a non-uniform $N_s$-QAM constellation according to embodiments of the present disclosure, new parameters q and p are used to balance the various interests in order to provide the GNC super-constellation, where q guarantees the desired power split between the users and p relates to unit constellation power. One key factor is where to insert the factor of q in the nested structure so as to split the constellation and power between near and far UEs. In an embodiment where the far UE takes the outer bits and near UE takes the inner bits, the q factor should be inserted at the following level in the nested structure as shown in Equation (3) below:

$$\ldots \left[ 2^{\frac{\log_2(N_n)}{2}} - q\left(1 - 2b_{\log_2\left(\frac{N_s}{N_n}\right)}\right)[\ \ldots\ ] \right] \quad (3)$$

As mentioned above, new parameter q is designed to maintain Gray mapping in joint/super constellations between two or more UEs in light of the specific power constraints and/or desired power conditions.

A specific example is presented in the section below.

A. (QPSK, QPSK) Example of a Nested Constellation Structure

Figure 2:
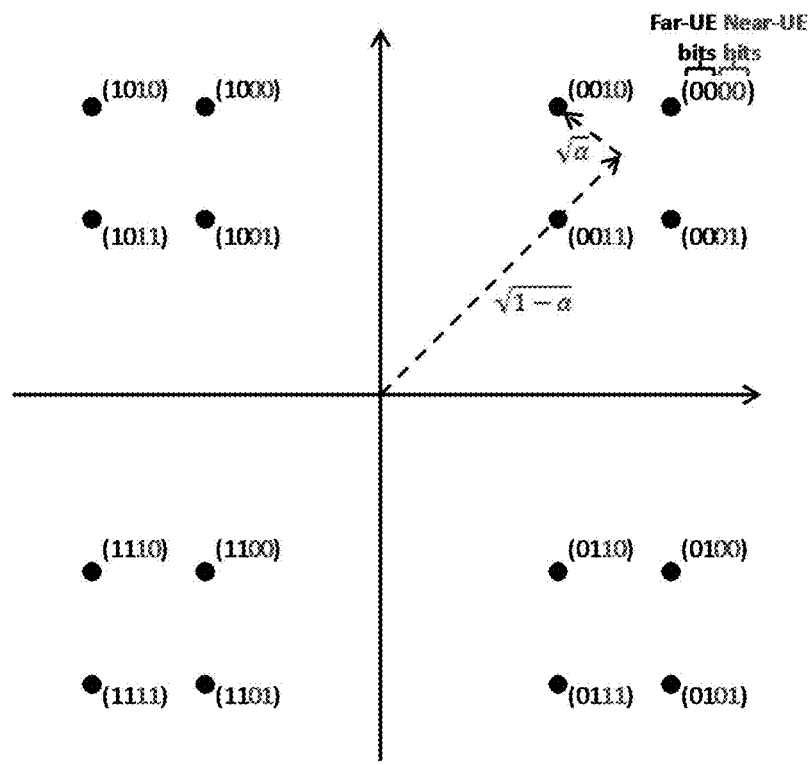
FIG. 2 is a super-constellation formed by direct symbol mapping (DSM) of a (QPSK,QPSK) modulation pair for a far user and a near user.
Figure 3A:
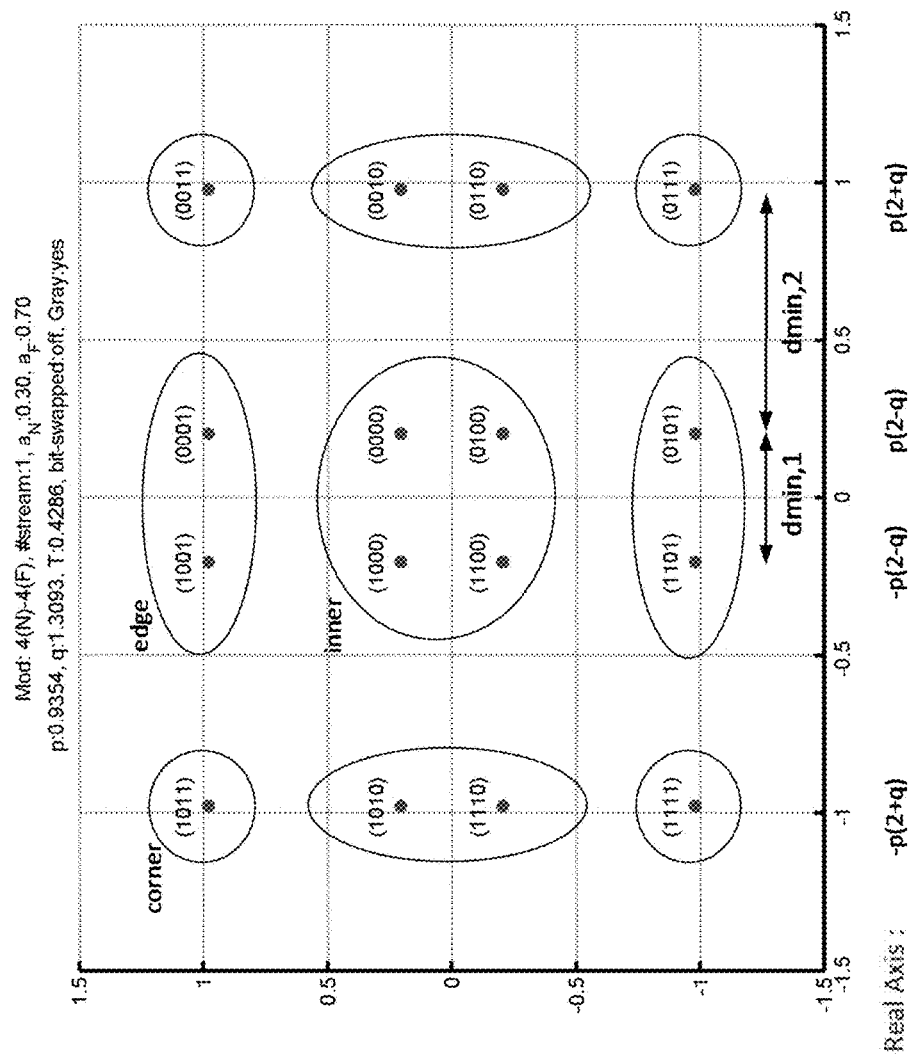
FIG. 3A is a super-constellation formed by Gray mapping a (QPSK,QPSK) modulation pair for a far user and a near user according to an embodiment of the present disclosure.
Figure 3B:
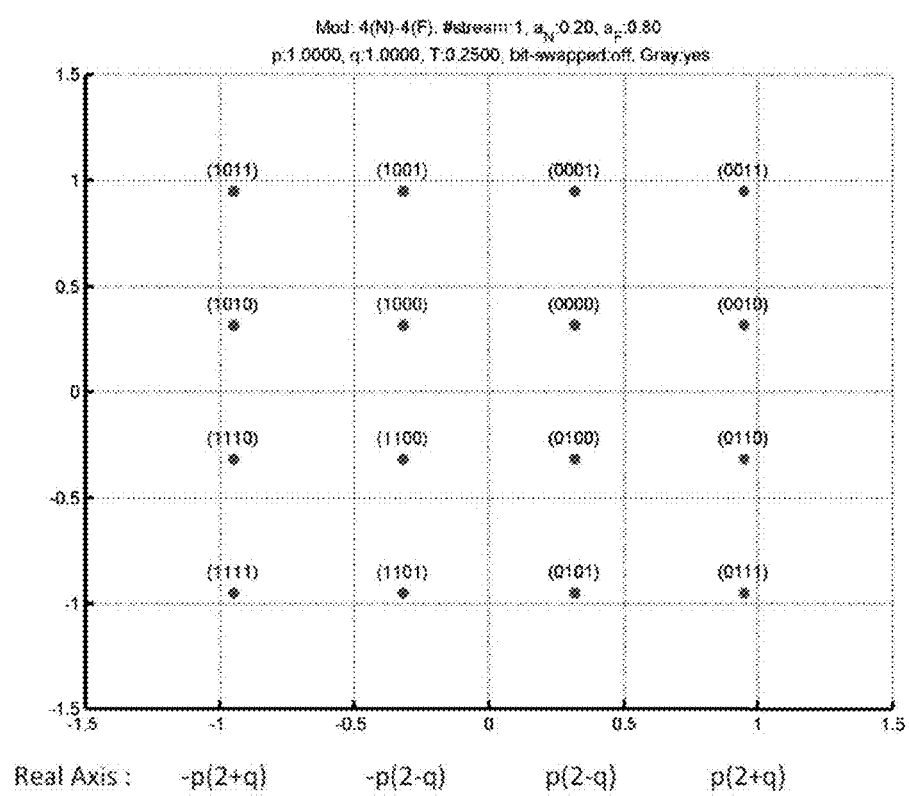
FIG. 3B is a super-constellation formed by Gray mapping a (QPSK,QPSK) modulation pair for a far user and a near user according to an embodiment of the present disclosure.

In this section, a (QPSK,QPSK) modulation pair mapping to a 16-QAM super-constellation, like FIG. 2, will be presented in FIGS. 3A and 3B according to embodiments of the present disclosure. Also like FIG. 2, each four-bit ("super")-symbol ($b_0$, $b_1$, $b_2$, $b_3$) comprises two far user bits, ($b_0$, $b_1$)=($d_0^F d_1^F$), and two near users bits, ($b_2$, $b_3$)=($d_0^N d_1^N$).

The mappings in FIGS. 3A and 3B are different from FIG. 2. The far user bits still have the same pattern of values as FIG. 2, with (10) for the upper-left quadrant of the super-constellation, (00) for the upper-right quadrant, (01) for the lower-right quadrant, and (11) for the lower left quadrant. However, near user bits ($b_2$, $b_3$) define Gray labeled constellation points with each set for a given value of the pair ($b_0$, $b_1$). In other words, the pairs of bits ($b_0$, $b_1$) and ($b_2$, $b_3$) form a nested structure where ($b_0$, $b_1$) constitute the "outer" part of the direct sum and ($b_2$, $b_3$) form the "inner" part of the direct sum, as shown in Equation (4)(a).

$$(b_0, b_1, b_2, b_3) = \underbrace{(b_0, b_1)}_{\text{(outer part)}} \oplus \underbrace{(b_2, b_3)}_{\text{(inner part)}} \quad (4)(a)$$

Without loss of generality, $\alpha_F > \alpha_N = 1 - \alpha_F$ or, equivalently, $\alpha_F > 0.5$ is assumed (generally, it is expected that the larger fraction of power is allocated to the far user in NOMA; if this is not the case, the roles of $\alpha_F$ and $\alpha_N$ can be swapped—so this assumption is not restrictive).

Furthermore, the unequal power split can be made part of the symbol mapping process using new parameters q and p as shown in Equations (4)(b) and (4)(c) below:

$$x = \frac{1}{\sqrt{C}} \left\{ \begin{array}{l} p(1-2b_0)[2-q(1-2b_2)] + \\ jp(1-2b_1)[2-q(1-2b_3)] \end{array} \right\} \quad (4)(b)$$

which is the same as $$x = \frac{1}{\sqrt{C}} \left\{ \begin{array}{l} p(1-2d_0^F)[2-q(1-2d_0^N)] + \\ jp(1-2d_1^F)[2-q(1-2d_1^N)] \end{array} \right\} \quad (4)(c)$$

where p and q are positive real-valued numbers as discussed above and C is a power constraint value to normalize the power of symbols on the joint constellation map.

FIG. 3A shows a (QPSK,QPSK) modulation pair mapping to a 16-QAM super-constellation, using the values of p=0.9354 and q=1.3093, equivalent to $\alpha_N$=0.3 and $\alpha_F$=0.7, according to an embodiment of the present disclosure. The distances between constellation points/symbols are clearly not uniform.

While Equations (4)(b)/(c) provide the general mapping formula for a (QPSK,QPSK) modulation pair mapping to a non-uniform 16-QAM super-constellation, they also include a uniform 16-QAM super-constellation according to an embodiment of the present disclosure as a special case. Namely, setting the values p=q=1 or equivalently $\alpha_F$>0.8 results in a uniform 16-QAM super-constellation with the unique inner/outer qualities according to an embodiment of the present disclosure.

Accordingly, FIG. 3B shows a (QPSK,QPSK) modulation pair mapping to a 16-QAM super-constellation, using the values of p=1 and q=1, equivalent to $\alpha_N$=0.2 and $\alpha_F$=0.8, according to an embodiment of the present disclosure. In this special case of the more general GNC mapping equations, the distances between constellation points/symbols are uniform.

3GPP RAN1 has established scenarios to evaluate implementations of MUST (i.e., superposition systems). Initially, only two scenarios were used: "Scenario 1", a one-layer or scalar environment and "Scenario 2", a multi-layer environment where a rank 2 precoded signal is transmitted to the near user while a rank 1 slightly differently precoded signal is transmitted to the far user. For more details regarding the scenarios, see, for example, the four U.S. provisional patent applications from which the present application claims priority which have also been expressly incorporated by reference.

To meet those scenarios, p and q of the 16-QAM (QPSK, QPSK) super-constellation are subject to certain constraints. For Scenario 1 (scalar/one-layer superposition), the constraints are:
1) $2p^2(4+q^2)$=C which arises from unit constellation power; and
2)

$$\frac{q^2}{4} = \frac{1-\alpha_F}{\alpha_F},$$

which arises from the power split requirement between ($b_0$, $b_1$) bits and ($b_2$, $b_1$) bits.

For Scenario 2 (two-layer superposition), the constraints are:
1) $2p^2(4+q^2)$=0.5C(1+$\alpha_F$); and
2)

$$\frac{q^2}{4} = \frac{1-\alpha_F}{2\alpha_F}.$$

The constellation that x belongs to is denoted as $S_{p,q}$ ($X_{QPSK}$, $X_{QPSK}$) since it is formed from underlying (QPSK, QPSK) constellations and parameterized by p, q. In the above, p can always be set equal to 1 since it is scaled out by the normalization factor C. Thus, according to an embodiment of the present disclosure, the nonlinear mapping of the form $x=f_{p,q}(x_0, x_1)$ is defined, which results in a Gray-mapped Non-uniform Constellation, also known as GNC. A mentioned above, the conventional 16-QAM constellation is a special type of GNC, i.e., when p=q=1.

Since selective "companding" (i.e., compression and expansion of different sets of constellation points) was applied to a Gray encoded constellation above, it is easy to verify that the bit labeling resulting from Equations (4)(b)/(c) above is also Gray. Any two adjacent symbols of the super-constellation differ by only one bit because the underlying constellation is Gray encoded.

Moreover, as can be seen in FIGS. 3A and 3B, in the four symbols in the center, the near user bits do not change (i.e., they are all "00") while the far user bits do. This is in contrast with FIG. 2 (i.e., direct symbol mapping), where both the near and far bits in the four center symbols change per symbol.

While the (QPSK, QPSK) 16-QAM super-constellation is provided as an example above, additional super-constellations can be generated in the same manner. For example, the specific equations and constraints for the super-constellations shown in Table 1 below are provided in the APPENDIX I appended hereto, as well as in U.S. Prov. Pat. App. Ser. Nos. 62/173,241 and 62/203,818, from which the present application claims priority (and which have been incorporated by reference in their entirety).

TABLE 1

| "Far" UE constellation ($2^{K_F}$)-QAM | "Near" UE constellation ($2^{K_N}$)-QAM | Resulting "Super-constellation" ($2^{K_F+K_N}$)-QAM |
|---|---|---|
| QPSK | QPSK | 16QAM |
| 16QAM | QPSK | 64QAM |
| QPSK | 16QAM | 64QAM |
| 16QAM | 16QAM | 256QAM |
| 64QAM | QPSK | 256QAM |
| QPSK | 64QAM | 256QAM |
| 64QAM | 16QAM | 1024QAM |
| 16QAM | 64QAM | 1024QAM |
| 64QAM | 64QAM | 4096QAM. |

B. General Mapping for Arbitrary Constellation Pairs

The approach above can be extended to any arbitrary combination of constituent constellations. Like before, the "near" UE and "far" UE are inter-changeable. The "far" user's bits are mapped to the outer part of the resultant constellation and the near user's bits are mapped to the inner part of the resultant constellation. As a result, the bit mapping for (QPSK,16QAM) is not the same as that for (16QAM,QPSK), for example.

When viewed more generally, the outer bits (mapped to the far user in the above example) can be viewed as the "base layer" and the inner bits (mapped to the near user in the above example) can be viewed as the "extension layer".

(1) General GNC Equation Using M(•) Function

Accordingly, the generally-applicable GNC equation can be written as a linear combination of the base layer ($x_F$) and a function of the base layer and extension layer ($x_N$), as set forth in Equation (5):

$$x = \frac{p}{\sqrt{C}} \left\{ \begin{array}{l} ax_F + q(M(d_0^F d_2^F \cdots d_{K_F-2}^F)\text{Re}\{x_N\} + \\ jM(d_1^F d_3^F \cdots d_{K_F-1}^F)\text{Im}\{x_N\}) \end{array} \right\} \quad (5)$$

where a is a factor that depends on the modulation orders and $M(d_0^F d_2^F \ldots d_{K_F-2}^F)$ and $M(d_1^F d_3^F \ldots d_{K_F-1}^F)$ represent the function $M(\bullet)$ applied to the even and odd bits of the base layer $x_F$ respectively.

Function $M(\bullet)$ takes only the values of $-1$ and $+1$. As a result, the I and/or Q values of the extension layer symbol $x_N$ undergo sign inversions (equivalent to reflections of the constellation) after the mapping of data bits $\{d_0^N \ldots d_{K_N-1}^N\}$ to a ($2^{K_N}$)-QAM constellation prior to transmission.

The function $M(d_0 d_1 \ldots d_{K-1})$ is summarized for the different modulation order pairs in Table 2 below.

Figure 4:
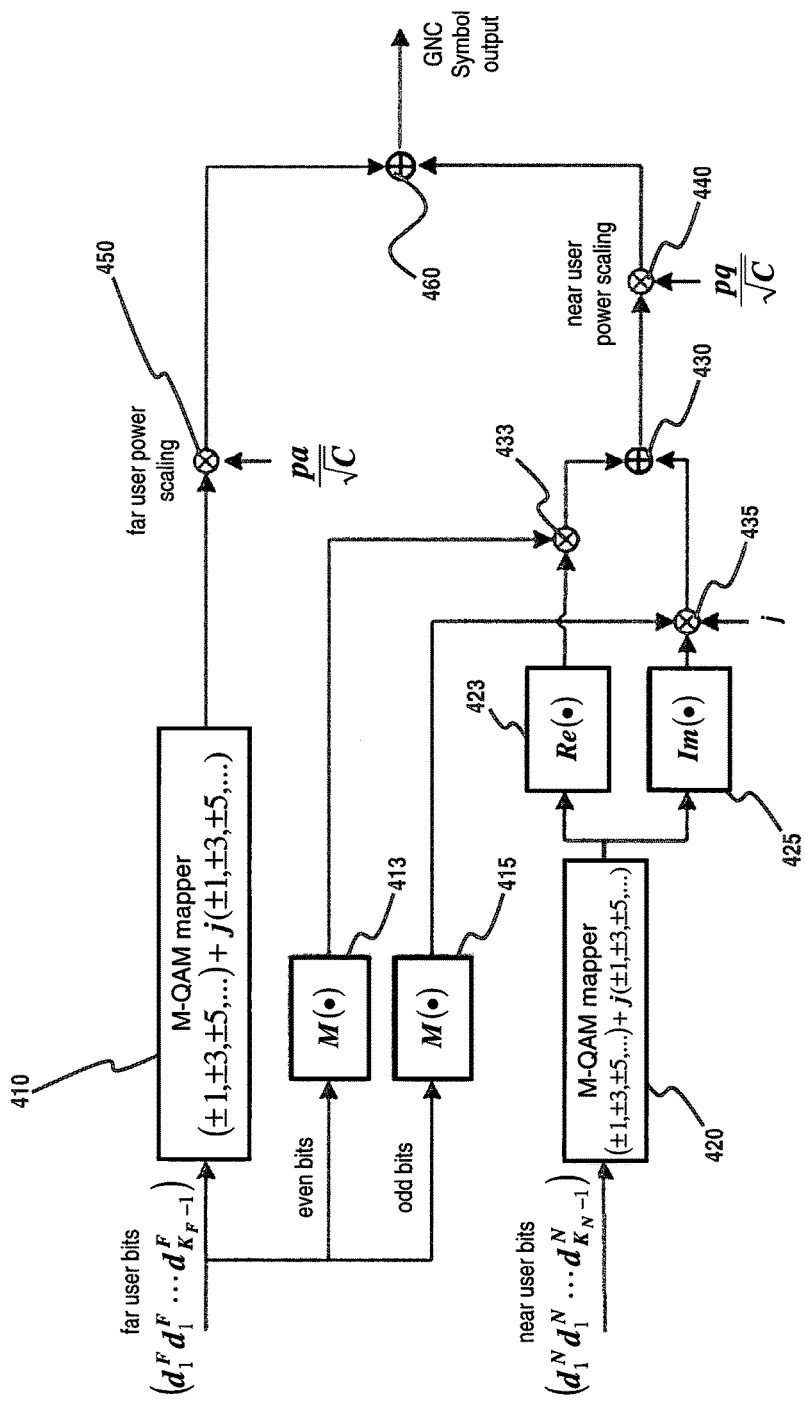
FIG. 4 is a conceptual diagram of a GNC signal generation apparatus using an M(•) function according to an embodiment of the present disclosure.

TABLE 2 a and M(•) for Different Modulation Pairs - (FIG. 4)

| "Far" UE constellation ($2^{K_F}$)-QAM | "Near" UE constellation ($2^{K_N}$)-QAM | Resulting "Super-constellation" ($2^{K_F+K_N}$)-QAM | a | $M(d_0 d_1 \ldots d_{K-1})$ |
|---|---|---|---|---|
| QPSK | QPSK | 16-QAM | 2 | $-(1 - 2d_0)$ |
| 16-QAM | QPSK | 64-QAM | 2 | $(1 - 2d_0)(1 - 2d_1)$ |
| QPSK | 16-QAM | 64-QAM | 4 | $-(1 - 2d_0)$ |
| 16-QAM | 16-QAM | 256-QAM | 4 | $(1 - 2d_0)(1 - 2d_1)$ |
| 64-QAM | QPSK | 256-QAM | 2 | $-(1 - 2d_0)(1 - 2d_1)(1 - 2d_2)$ |
| QPSK | 64-QAM | 256-QAM | 8 | $-(1 - 2d_0)$ |
| 64-QAM | 16-QAM | 1024-QAM | 4 | $-(1 - 2d_0)(1 - 2d_1)(1 - 2d_2)$ |
| 16-QAM | 64-QAM | 1024-QAM | 8 | $(1 - 2d_0)(1 - 2d_1)$ |
| 64-QAM | 64-QAM | 4096-QAM. | 8 | $-(1 - 2d_0)(1 - 2d_1)(1 - 2d_2)$ |

FIG. 4 is a conceptual diagram of a GNC signal generation apparatus for generating a GNC signal in accordance with Equation (5) above, using the M(•) function and assuming that the far user bits are mapped to the base layer, according to an embodiment of the present disclosure.

As shown in FIG. 4, all of the far user bits ($d_0^F d_1^F \ldots d_{K_F-1}^F$) are input to M-QAM mapper 410, while at the same time the even bits of the far user bits are input into M(•) module 413 and the odd bits of the far user bits are input into M(•) module 415. The M-QAM mapper 410 performs the function of mapping the far user bits, thereby producing the far user signal which is subsequently power scaled by $$\frac{pa}{\sqrt{C}}$$

at 450 before being mixed with the near user signal at 460 to produce the GNC symbol output. On the other hand, M(•) module 413 performs the M(•) function on the far user even bits and M(•) module 415 performs the M(•) function on the far user odd bits, which are used in generating the near user signal, as discussed below.

All of the near user bits ($d_0^F d_1^F \ldots d_{K_F-1}^F$) are input to M-QAM mapper 420, which, similarly to M-QAM mapper 410, performs the function of mapping the near user bits. The output of M-QAM mapper 420 is input to both the Re(•) module 423, which creates the real part of the signal, and the Im(•) module 425, which creates the imaginary part of the signal.

The output of M(•) module 415 is mixed with the output of Im(•) module 425 and the imaginary value j at 435. Similarly, the output of M(•) module 413 is mixed with the output of Re(•) module 423 at 433. Those mixed outputs are themselves mixed at 430 to produce the near user portion of the signal, which undergoes power scaling by being mixed with $$\frac{pq}{\sqrt{C}}$$

at 440 before being mixed with the far user signal at 460 to produce the GNC symbol output.

The present disclosure is not limited to the linear combination shown in Equation (5) and generated in FIG. 4 but rather can take a number of forms. Accordingly, a signal generation technique and signal generation apparatus according to another embodiment are described below.

(2) General GNC Equation Using N(•) Function

Figure 5:
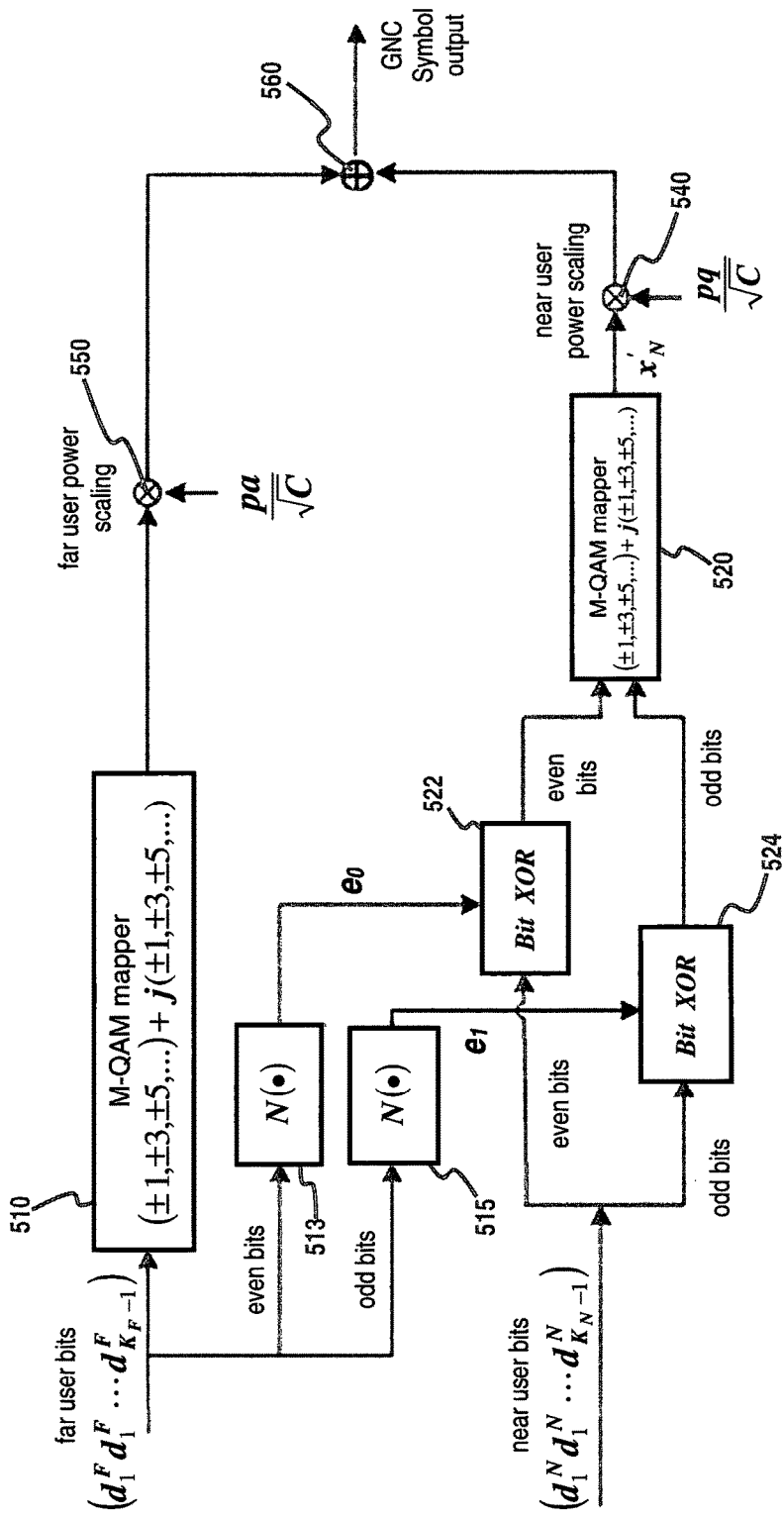
FIG. 5 is a conceptual diagram of a GNC signal generation apparatus using an N(•) function according to an embodiment of the present disclosure.

More specifically, FIG. 5 is a conceptual diagram of a signal generation apparatus using bit-level operations and an N(•) function, where the generally applicable GNC equation for FIG. 5 is written as set forth in Equation (6):

$$x = \frac{p}{\sqrt{C}}\{ax_F + qx'_N\} \quad (6)$$

where a is a factor that depends on the modulation orders, like in Eq. (5), and $x'_N$ is the M-QAM constellation that corresponds to the bit sequence $\{c_0, c_1, \ldots, c_{K_F-1}\}$, where:

$$\{c_0, c_2, \ldots, c_{K_F-2}\} = \{e_0 \oplus d_0^N, e_0 \oplus d_2^N, \ldots, e_0 \oplus d_{K_F-2}^N\} \quad (7)(a)$$

$$\{c_1, c_3, \ldots, c_{K_F-1}\} = \{e_1 \oplus d_1^N, e_1 \oplus d_3^N, \ldots, e_1 \oplus d_{K_F-1}^N\} \quad (7)(b)$$

and $$e_0 = N(d_0^F, d_2^F, \ldots, d_{K_F-2}^F) \quad (8)(a)$$

$$e_1 = N(d_1^F, d_3^F, \ldots, d_{K_F-1}^F) \quad (8)(b)$$

The N(•) function takes only the binary values of 0 and 1 and the function $N(d_0\, d_1\, \ldots\, d_{K-1})$ is summarized for the different modulation order pairs in Table 3 below.

TABLE 3 a and N(•) for Different Modulation Pairs - (FIG. 5)

| "Far" UE constellation ($2^{K_F}$)-QAM | "Near" UE constellation ($2^{K_N}$)-QAM | Resulting "Super-constellation" ($2^{K_F+K_N}$)-QAM | a | $N(d_0 d_1 \ldots d_{K-1})$ |
|---|---|---|---|---|
| QPSK | QPSK | 16-QAM | 2 | $1 \oplus d_0$ |
| 16-QAM | QPSK | 64-QAM | 2 | $d_0 \oplus d_1$ |
| QPSK | 16-QAM | 64-QAM | 4 | $1 \oplus d_0$ |
| 16-QAM | 16-QAM | 256-QAM | 4 | $d_0 \oplus d_1$ |
| 64-QAM | QPSK | 256-QAM | 2 | $1 \oplus d_0 \oplus d_1 \oplus d_2$ |
| QPSK | 64-QAM | 256-QAM | 8 | $1 \oplus d_0$ |
| 64-QAM | 16-QAM | 1024-QAM | 4 | $1 \oplus d_0 \oplus d_1 \oplus d_2$ |
| 16-QAM | 64-QAM | 1024-QAM | 8 | $d_0 \oplus d_1$ |
| 64-QAM | 64-QAM | 4096-QAM. | 8 | $1 \oplus d_0 \oplus d_1 \oplus d_2$ |

As stated above, FIG. 5 is a conceptual diagram of a GNC signal generation apparatus for generating a GNC signal in accordance with Equation (6) above, using the N(•) function and assuming that the far user bits are mapped to the base layer, according to an embodiment of the present disclosure.

As shown in FIG. 5, all of the far user bits $(d_0^F\, d_1^F\, \ldots\, d_{K_F-1}^F)$ are input to M-QAM mapper 510, while at the same time the even bits in the far user bits are input into N(•) module 513 and the odd bits in the far user bits are input into N(•) module 515. The M-QAM mapper 510 performs the function of mapping the far user bits, thereby producing the far user signal which is subsequently power scaled by $$\frac{pa}{\sqrt{C}}$$

at 550 before being mixed with the near user signal at 560 to produce the GNC symbol output. On the other hand, N(•) module 513 performs the N(•) function on the far user even bits, producing $e_0$, and N(•) module 515 performs the N(•) function on the far user odd bits, thereby producing $e_1$, which are used in generating the near user signal, as discussed below.

On the other hand, the near user bits $\{d_0^N \ldots d_{K_N-1}^N\}$ are split into its even bits, which are input to Bit XOR module 522, and its odd bits, which are input to Bit XOR module 524. Bit XOR module 522 and Bit XOR module 524 also receive $e_0$, and $e_1$ as input from N(•) module 513 and N(•) module 515, respectively. Thus, Bit XOR module 522 performs the XOR operation on the even near user bits and $e_0$ and Bit XOR module 524 performs the XOR operation on the even near user bits and $e_1$. The even XOR'd bits from Bit XOR module 522 and the odd XOR'd bits from Bit XOR module 524 are both input into M-QAM mapper 520, which converts the series of both even and odd bits to a QAM symbol.

The output of M-QAM mapper 520, comprising $x'_n$, undergoes power scaling by being mixed with $$\frac{pq}{\sqrt{C}}$$

at 540 before being mixed with the far user signal at 560 to produce the GNC symbol output.

C. Extension to More than Two Users

In yet another related embodiment of the present disclosure, the Gray mapping method can be extended to more than two users, i.e., a K-user system.

Information symbols of K users can be linearly superposed to yield Equation (9):

$$x = \sqrt{\alpha_0}x_0 + \sqrt{\alpha_1}x_1 + \ldots + \sqrt{\alpha_{K-1}}x_{K-1} \quad (9)$$

where $x_j$ is the M-QAM symbol for the j-th user such that $\alpha_j > 0$ and the constraint $\alpha_0 + \alpha_1 + \ldots + \alpha_{K-1} = 1$ holds.

When, for example, the K=2, the signal received at a given user's receiver can be written as Equation (10) below:

$$y = h(\sqrt{\alpha_N}x_0 + x_0 + \sqrt{\alpha_F}x_1) + n \quad (10)$$

where $y = [y_0, \ldots, y_{n_R-1}]^T$ is a $n_R \times 1$ receive signal vector, h is the $n_R \times 1$ channel vector (which includes precoding at the eNB, if any), and n is the vector that models additive white Gaussian noise (AWGN) which has the distribution $CN(0, \sigma_n^2 I)$.

The bits for the K users can be mapped as a super-constellation from outermost bits to innermost bits of the super-constellation. The super-constellation is Gray encoded when some conditions on $\alpha_j$ are satisfied. For example, if all K users have QPSK as their single-user constellations, the mapping can be written as Equation (11):

$$(b_0, b_1, b_2, b_3, \ldots, b_{2K-2}, b_{2K-2}) = (b_0, b_1) \oplus (b_2, b_3) \ldots \oplus (b_{2K-2}, b_{2K-1}) \quad (11)$$

leading to a ($2^{2K}$)-QAM super-constellation. For example, for K=3, this approach leads to bits-to-symbol mapping defined by Equation (12):

$$x = \frac{1}{\sqrt{C}}\left\{\begin{array}{l}(1-2d_0^{(0)})p[4-q(1-2d_0^{(1)})[2-r(1-2d_0^{(2)})]] + \\ j(1-2d_1^{(0)})p[4-q(1-2d_1^{(1)})[2-r(1-2d_3^{(2)})]]\end{array}\right\} \quad (12)$$

where $(d_0^{(j)} d_1^{(j)})$ refers to the bits of the j-th user, and p, q, and r are positive real-valued numbers which, in Equation (12), are subject to the constraint indicated by Equation (13):

$$2p^2(16 + 4q^2 + q^2r^2) = C \quad (13)$$

It is trivial to extend the above to the case of arbitrary combinations of modulation orders for the K users.

As shown above, a new type of bit-to-symbol mapping produces a new type of super-constellation, the Gray-mapped Non-uniform Constellation, or Gray-mapped Non-uniform-capable Constellation, (GNC). Several methods for providing such mapping are described and it is shown that it can be extended to any arbitrary number of users (i.e., more than simply a "near" and a "far" user).

II. Adaptive Scheduling/Mapping using GNC

A. Adaptive Bit Swapping to Maintain Gray Mapping

According to an embodiment of the present disclosure, adaptive bit mapping can be used to maintain Gray mapping, irrespective of the relative powers of the far user and the near user.

In the GNC mapping described above, certain conditions need to be maintained. For example, in order for Gray mapping to be maintained in a (QPSK, QPSK) super-constellation, the condition q<2 needs to be satisfied. The same condition needs to be met for (16QAM, QPSK) and (64QAM, QPSK) super-constellations. Similarly, the condition 3q<4 needs to be satisfied for the (QPSK, 16QAM) and (16QAM, 16QAM) super-constellations. For (QPSK, 64QAM), the condition 7q<8 needs to be satisfied.

Accordingly, the power ratio $$\frac{\alpha_N}{\alpha_F} = \frac{1-\alpha_F}{\alpha_F} < T$$

for Scenario 1 and the power ratio $$\frac{\alpha_N/2}{\alpha_F} = \frac{1-\alpha_F}{\alpha_F} < T$$

for Scenario 2 must be satisfied for the values of T given by Table 4 below.

TABLE 4

Necessary Conditions for Maintenance of Gray Mapping

| (far, near) Modulation pair | T |
|---|---|
| (QPSK, QPSK) | 1 |
| (16-QAM, QPSK) | 1/5 |
| (QPSK, 16-QAM) | 5/9 |
| (16-QAM, 16-QAM) | 1/9 |
| (64-QAM, QPSK) | 1/21 |
| (QPSK, 64-QAM) | 3/7 |
| (64-QAM, 16-QAM) | TBD |
| (16-QAM, 64-QAM) | TBD |
| (64-QAM, 64-QAM) | TBD |

When the above power ratio conditions are not met, direct mapping leads to a non-Gray mapping. However, Gray mapping is still possible, if the roles of the near and far users are swapped, i.e., the outer bits can be assigned to the near user and the inner bits can be assigned to the far user, leading to near user bits $(b_0, b_1, \ldots) = (d_0^N, d_1^N, \ldots)$ and far user bits $(b_{2k}, b_{2k+1} \ldots) = (d_0^F, d_1^F, \ldots)$.

TABLE 5

GNC Exclusion Region for Gray Mapping based on $\frac{\alpha_N}{\alpha_F}$ ratio

| (far, near) Modulation pair | Scenario 1 | Scenario 2 |
|---|---|---|
| (QPSK, QPSK) | null set | null set |
| (16-QAM, QPSK) | (1/5, 9/5) | (2/5, 18/5) |
| (QPSK, 16-QAM) | (5/9, 5) | (10/9, 10) |
| (16-QAM, 16QAM) | (1/9, 9) | (2/9, 18) |
| (64-QAM, QPSK) | (1/21, 7/3) | (2/21, 14/3) |
| (QPSK, 64-QAM) | (3/7, 21) | (6/7, 42) |
| (64-QAM, 16-QAM) | TBD | TBD |
| (16-QAM, 64-QAM) | TBD | TBD |
| (64-QAM, 64-QAM) | TBD | TBD |

The above condition can be equivalently written as:
$\alpha_F > T_1$ (Gray mapping without bit swapping)
$\alpha_F < T_2$ (Gray mapping with swapping)

The exclusion region is defined with respect to $\alpha_F$ as $(T_1, T_2)$, for suitable real numbers $T_1$, $T_2$ such that $0 < T_2 < T_1 < 1$.

When the conditions for Gray mapping are not met due to power allocation at the scheduler, there are two options:
Option 1: Maintain GNC mapping
Option 2: Fall back to direct symbol mapping Even when the conditions for Gray mapping are violated, there are certain scenarios (certain pairs of MCS and power ratio) where GNC outperforms DSM.

In this embodiment, Gray mapping is used whenever feasible, by adaptively selecting GNC or DSM as follows:
if $\alpha_F > t_0$ use GNC with no swapping and mapping far user bits to outer bits and
if $\alpha_F < t_1$ use GNC with bit swapping and mapping far user bits to inner bits,
if $t_1 < \alpha_F < t_0$, use DSM where $t_0$ and $t_1$ are two thresholds, such that $t_1 \leq t_0$. The thresholds $t_0$ and $t_1$ need to be selected based on the MCS pair being used for the two users. For many constellation pairs (lower order QAM), either GNC without swapping or GNC with swapping is better than DSM for any $\alpha_F$, thus, $t_0 = t_1$. For other constellation pairs (mainly higher order QAM), there is a small region within $t_1 < \alpha_F < t_0$ where DSM outperforms GNC.

There may also be some benefit in transitioning to bit swapping either a "little early" as, for example, $\alpha_F$ increases for trading off far user performance for near user user performance, or a "little late", as, for example, $\alpha_N$ increases for trading off near SNR for far user SNR. For example, for (QPSK, QPSK) a threshold may be chosen to be slightly smaller than for 1 (instead of exactly 1) for bit swapping. As another example, for (QPSK, QPSK) a threshold $t_0$ to be smaller that 0.5 (instead of exactly 0.5) for bit swapping. The thresholds can be modified based on the user MCS selected.

In addition to the relative powers allocated by the scheduler for the near user and the far user and the user rank, the near user MCS and the far user MCS also need to be taken into account in order to determine whether the outer bits should be mapped to the far user or the near user. Bit swapping leads to a different minimum distance for near (far) user symbols compared to no swapping. Accordingly, the target Block Error Rate (BLER) is a function of both the bit mapping order (i.e., no swapping vs. bit swapping) and the relative power allocation for the two users (and additionally the transmission rank for the two users).

In general, the scheduler needs to determine the target rates achievable for both no-swapping and bit-swapping options based on the minimum distance (for near and far user symbols in the super-constellation) achieved with either option. The largest MCS pair that can achieve a certain target BLER level with no-swapping may be different from the largest MCS pair that can achieve the same target BLER level with bit-swapping.

Accordingly, the scheduler needs to jointly perform:
1. user pair selection,
2. decision to transmit using MUST vs. use single user transmission on an RB or set of RBs
3. MUST transmission configuration
   a. transmission rank
   b. power split among users/power split selection
   c. user MCS pair for MUST,
   d. selection of (i) GNC w/swap; (ii) GNC w/o swap; and (iii) DSM.

The selection can be made jointly in order to maximize weighted sum rate, packet flow (PF) metric, and other parameters at the scheduler.

Therefore, the bit-swapping criterion can be formulated as any one of the options below, i.e., bit-swapping is performed if any one of Equations (14)(i) through (14)(v) is met:

$$f_1(\alpha_N, \alpha_F, r_N, r_F, MCS_N, MCS_F) < T_1 \quad (14)(i)$$

$$f_2(\alpha_N, \alpha_F, r_N, r_F, MCS_N, MCS_F) < T_2(m_N, m_F) \quad (14)(ii)$$

$$f_3\left(\frac{\alpha_N}{\alpha_F}, r_N, r_F, MCS_N, MCS_F\right) < T_2(m_N, m_F) \quad (14)(iii)$$

$$f_4\left(\frac{\alpha_N}{\alpha_F}, MCS_N, MCS_F\right) < T_3(m_N, m_F, r_N, r_F) \quad (14)(iv)$$

$$f_5\left(\frac{\alpha_N}{\alpha_F}\right) < T_4(m_N, m_F, r_N, r_F, MCS_N, MCS_F) \quad (14)(v)$$

Here:
$f_1$, $f_2$, $f_3$, $f_4$, $f_5$ are various mapping functions;
$T_1$ is a threshold;
$T_2$, $T_3$ and $T_4$ are threshold functions;
$MCS_N$, $MCS_F$ are MCSs for the near user and far user respectively (this implicitly includes modulation information);
$m_N$, $m_F$ are modulation orders for the near user and far user respectively (these are dependent on the selected $MCS_N$, $MCS_F$; and
$r_N$, $r_F$ are transmission ranks for the near user and far user respectively.

When a GNC scheme is used, the "no-swapping" vs. "bit-swapping" selection problem is a part of the scheduler implementation where the scheduler jointly performs user selection and MUST vs. no MUST selection, and if MUST is employed, the scheduler performs user MCS pair, rank, and power split selection.

If either user has a rank 2 transmission, the user MCS can be replaced with the user MCS pair for the two layers. For example, for Scenario 2, $MCS_N$ can be replaced with the pair $(MCS_{N,1}, MCS_{N,2})$, which denotes the MCS for the two layers in the above-described threshold criteria.

Figure 6A:
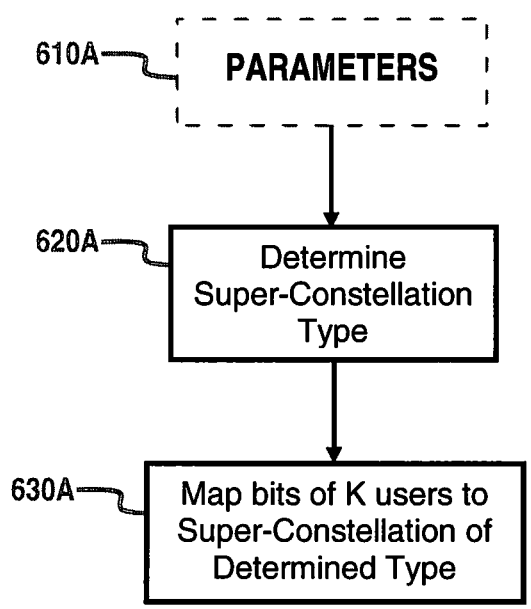
FIG. 6A is a flowchart illustrating the process of selecting and generating super-constellations according to various embodiments of the present disclosure.

FIG. 6A is a flowchart illustrating the process of selecting and generating super-constellations according to various embodiments of the present disclosure. FIG. 6A is a simplistic representation of the main operations and factors involved.

In 610A, the parameters used to make the following decisions are received, collected, and/or generated, such as, for example, the α power ratio. In 620A, the type of super-constellation to use is determined, based on the parameters of 610A. Finally, in 630A, the bits of the K users are mapped to the super-constellation of the determined type.

Figure 6B:
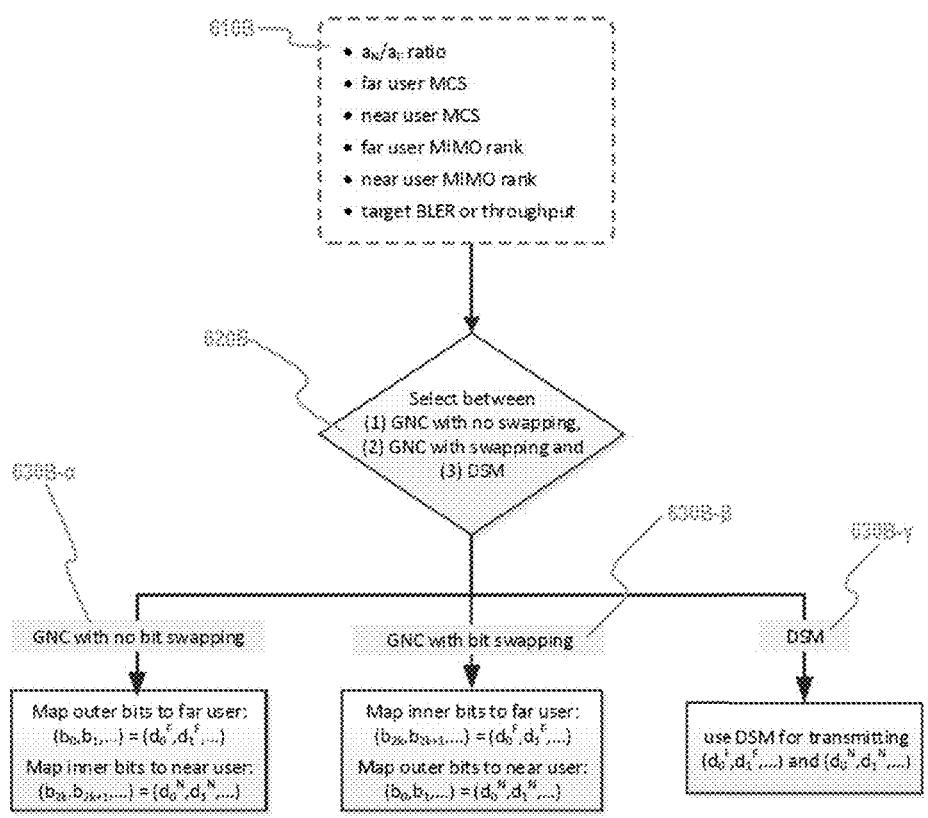
FIG. 6B a flowchart illustrating decision logic involved in the processes of scheduling, mapping, and modulation, according to an embodiment of the present disclosure.

FIG. 6B is a flowchart illustrating decision logic involved in the processes of scheduling, mapping, and modulation, according to an embodiment of the present disclosure. In other words, FIG. 6B fills in some of the details and examples involved in an implementation of FIG. 6A. FIG. 6B is a simplistic representation of what would be implemented as a number of interacting processes and subroutines and is being used for purposes of explanation only.

In 610B, data needed to make the following decisions are received, including, but not limited to, one or more of the $\alpha_N/\alpha_F$ power ratio, the far user MCS, the near user MCS, the far user Multiple Input Multiple Output (MIMO) rank, the near user MIMO rank, target BLER, target throughput, and similar possibly pertinent parameters, as would be known to one of ordinary skill in the art.

In 620B, the selection, based at least in part on the data received in 610A, is made among:
GNC with no swapping;
GNC with swapping; and
DSM.

The scheduler/modulation mapper determines whether the criterion passes based on the received elements. When the criterion passes, the scheduler/modulation mapper maps outer bits to the far user and maps inner bits to the near user. When the criterion does not pass, the scheduler/modulation mapper maps outer bits to the near user and maps inner bits to the far user.

If GNC with no swapping is selected in 620B, the outer bits are mapped to the far user: $(b_0, b_1, \ldots) = (d_0^F, d_1^F, \ldots)$, and the inner bits are mapped to the near user: $(b_{2K}, b_{2K+1}, \ldots) = (d_0^N, d_1^N, \ldots)$, i.e., no bit swapping, in 630B-α.

If GNC with swapping is selected in 620B, the inner bits are mapped to the far user: $(b_{2K}, b_{2K+1}, \ldots) = (d_0^F, d_1^F, \ldots)$, and the outer bits are mapped to the near user: $(b_0, b_1, \ldots) = (d_0^N, d_1^N, \ldots)$, i.e., the far and near bits have swapped inner-outer, in 630B-Pβ.

If DSM is selected in 620B, the far user's bits $(d_0^F, d_1^F, \ldots)$ and the near user's bits $(d_0^N, d_1^N, \ldots)$ are directly mapped in 630B-γ.

When the bits are swapped before transmission, three detectors are feasible, as set forth below.
1) Full joint LLR generation—for this option, either Log-MAP (Maximum A Posterlori) (best performance) or Max-Log-MAP can be used to generate LLRs for both near and far user bits;
2) Perform hard slicing of the near user first treating the far user as noise, then symbol SIC to remove the near user interference, and then generate far user LLR; and
3) Treating the near user as noise and perform SU detection on far user data.

While the third option is simplest, it will have poor performance. The first option has the best performance but involves determining an LLR for the bits of the super-constellation.

III. MUST Detector

There are several symbol detector options for MUST. For joint demapping, both $x_F$ and $x_N$ are jointly demapped by both far and near UEs (i.e., independent of the UE near/far condition). The UE will need to implement up to 4096-QAM soft demapper even if only {QPSK, 16-QAM, 64-QAM} are allowed as the single-user constellations. Details for soft demapping of non-uniform M-QAM constellation (M<=4096) are described in greater detail below. The rank 1 (rk1) Log-MAP (direct method or using rk2 LM) approach can be used for this case. The UE will need to implement up to 65,536-QAM soft demapper if {QPSK, 16-QAM, 64-QAM, 256-QAM} are all allowed as single-user constellations. The rk2 DL-LM approach is used for computing LLR. Further details on rk2 LM with SIC or turbo-detection/decoding (Turbo-DD) when feasible for the non-uniform constellation are described in greater detail below.

For Hybrid SU detection and SIC based on a UE near/far condition, the near UE detects both $x_F$ and $x_N$. The UE uses successive interference cancellation (SIC) where $x_F$ is first detected (treating $x_N$ as noise) and cancelled followed by detection of $x_N$. The far UE always performs SU detection of $x_F$ (treating $x_N$ as noise). A UE determines if it is a near UE or a far UE based on measurements, e.g., reference signal received quality (RSRQ) or reference signal received power (RSRP) levels, or some other control information. This hybrid SU detection option outperforms joint demapping.

As mentioned above, there are three (3) options for lower complexity far user detection. The first option is the conventional detector and decoding. The near user is treated as noise and SU detection is performed on far user data. Although it is the simplest, the first option has poor performance as the near user maps to outer bits, which is highly non-Gaussian. The second option is Symbol-level IC (SLIC). The second option is a feasible option. For full joint LLR generation, either Log-MAP (best performance) or Max-Log-MAP can be used to generate LLRs for both near and far user bits. Hard slicing of the near user is performed first treating the far user as noise. Symbol SIC is then performed to remove near user interference and then generate far user LLR. The third option is CW-level IC (CWIC). Generally, the near user MCS is expected to be high and the SINR conditions at the far user may be insufficient to decode the near user CW even with side information. Thus, CWIC is likely infeasible.

The different detector options for near and far users are described in greater detail below.

A. Scalar/1-Layer Superposition

With respect to scalar or 1-layer superposition, the received signal can be written as Equation (15):

$$y = h(\sqrt{\alpha}x_0 + \sqrt{1-\alpha}x'_0) + n \quad (15)$$

where $y = [y_0, \ldots, y_{n_R-1}]^T$ is a $n_R \times 1$ receive signal vector, $x_0$ belongs to $(2^{K_1})$-QAM constellation which is the data symbol of interest and $x'_0$ belongs to $(2^{K_2})$-QAM constellation which is the data symbol for the co-scheduled UE, $\alpha$ is the power allocation value such that $0 < \alpha < 1$, and i is the $n_R \times 1$ channel vector (which includes precoding at the eNB, if any).

The log-likelihood ratio (LLR) for $b_{0,l}$, the l-th bit of $x_0$ (where $0 < l < K_1$), is the Log-MAP (LM) as shown in Equation (16) below:

$$L(b_{0,l}) = \log \frac{P(b_{0,l}=0|y)}{P(b_{0,l}=1|y)} \quad (16)$$

$$= \log \frac{P(y|b_{0,l}=0)P(b_{0,l}=0)}{P(y|b_{0,l}=1)P(b_{0,l}=1)}$$

$$= \log \frac{\sum_{x_0:b_{i,l}=0} \sum_{x'_0} P(y|x_0, x_1)}{\sum_{x_0:b_{i,l}=1} \sum_{x'_0} P(y|x_0, x_1)}$$

-continued $$= \log \frac{\sum_{x_0:b_{i,l}=0} \sum_{x'_0} e^{-\frac{\|y-h(\sqrt{\alpha}x_0+\sqrt{1-\alpha}x'_0)\|^2}{\sigma^2}}}{\sum_{x_0:b_{i,l}=1} \sum_{x'_0} e^{-\frac{\|y-h(\sqrt{\alpha}x_0+\sqrt{1-\alpha}x'_0)\|^2}{\sigma^2}}}$$

In the first approach, LLRs are obtained for the bits of the symbol $x = \sqrt{\alpha}x_0 + \sqrt{1-\alpha}x'_0$ using the joint soft-demapper as described below.

As an alternative approach, Max-Log-MAP approximation may be applied for one of the dimensions to get Equation (17) below:

$$L(b_{0,l}) = \log \frac{\Sigma_{x_0:\ b_{i,l}=0} \max_{x'_0} e^{-\frac{\|y-h(\sqrt{\alpha}x_0+\sqrt{1-\alpha}x'_0)\|^2}{\sigma^2}}}{\Sigma_{x_0:\ b_{i,l}=1} \max_{x'_0} e^{-\frac{\|y-h(\sqrt{\alpha}x_0+\sqrt{1-\alpha}x'_0)\|^2}{\sigma^2}}} \quad (17)$$

This is identical to 2-layer transmission with effective (rank 1) channel matrix $[\sqrt{\alpha}h, \sqrt{1-\alpha}h]$. Thus, an Rk 2 detector may be used for optimal or suboptimal symbol detection for 1-layer MUST transmission in the absence of a priori information. If a priori information is available, the Rk2 LM approach can be used.

To summarize, two approaches are possible for detection of scalar or 1-layer superposition transmission:
  Use joint soft-demapper to obtain LLRs for the bits of the symbol
    $x = \sqrt{\alpha}x_0 + \sqrt{1-\alpha}x'_0$.
  Use rk2 LM with SIC or Turbo-DD if feasible approach assuming effective (rank
    1) channel matrix $[\sqrt{\alpha}h, \sqrt{1-\alpha}h]$.

Both the near UE and the far UE can adopt the above methods (the latter option without SIC or Turbo-DD) if the modulation for the other user and the power split information are both known.

In addition to the modulation order for the other user if MCS and radio network temporary identifier (RNTI) information for the other user are known, it is possible for example for the near user to first obtain LLR for the far user, decode the far user CW and perform SIC to cancel the far user signal from the received signal. After this, the receiver can generate LLR for the near user symbols and perform decoding of the near user CW. In MUST context, this forms the CodeWord Interference Cancellation (CWIC) method.

B. Multi-Layer Superposition

With respect to multi-layer superposition, the received signal can be written as Equation (18):

$$y = v_1(\alpha x_0 + \beta x'_0) + v_2 x_1 + n \quad (18)$$

Suppose that $x_0$ belongs to $(2^{K_1})$-QAM constellation and $x_1$ belongs to $(2^{K_2})$-QAM constellation, which are the two data symbols of interest, and $x'_0$ belongs to $(2^{K_3})$-QAM constellation which is the data symbol for the co-scheduled UE.

The LLR for $b_{0,l}$, the l-th bit of $x_0$ (where $0 < l < K_1$), is the Log-MAP (LM) as shown in Equation (19) below:

$$L(b_{0,l}) = \log \frac{P(b_{0,l}=0 \mid y)}{P(b_{0,l}=1 \mid y)} \quad (19)$$

-continued $$= \log\frac{P(y \mid b_{0,I} = 0)P(b_{0,I} = 0)}{P(y \mid b_{0,I} = 1)P(b_{0,I} = 1)}$$

$$= \log\frac{\Sigma_{x_0:\ b_{i,I}=0}\Sigma_{x_1}\Sigma_{x'_0} P(y \mid x_0, x_1, x'_0)}{\Sigma_{x_0:\ b_{i,I}=1}\Sigma_{x_1}\Sigma_{x'_0} P(y \mid x_0, x_1, x'_0)}$$

$$= \log\frac{\Sigma_{x_0:\ b_{i,I}=0}\Sigma_{x_1}\Sigma_{x'_0} e^{-\frac{\|y-v_1(\alpha x_0+\beta x'_0)+v_2 x_1\|^2}{\sigma^2}}}{\Sigma_{x_0:\ b_{i,I}=1}\Sigma_{x_1}\Sigma_{x'_0} e^{-\frac{\|y-v_1(\alpha x_0+\beta x'_0)+v_2 x_1\|^2}{\sigma^2}}}$$

In the first approach, rk2LM (with SIC or Turbo-DD if feasible) approach is used, as follows:

Treat $[(v_1, v_2]$ as the effective rank 2 channel;

obtain LLRs for the bits of symbol $x_1$ (which belongs to the legacy M-QAM constellation);

obtain LLRs for the bits of the symbol $x=\alpha x_0+\beta x'_0$, using the joint soft-demapper.

For this case, the rk2 LM approach needs to be extended as shown below.

As an alternative, rk3/rk4 MIMO detector could be used by treating $[\alpha v_1, \beta v_1, v_2 x_1]$ as the effective channel matrix and assuming a 3-layer transmission. However, the rank of this effective channel is 2 since two of the columns are linearly dependent. As a result, the rk3 MMSE step to find the initial candidate $x_0$, etc., fails, at least at high SNR. On the other hand, rk3 lattice search methods can potentially be employed for obtaining LLRs of bits of $x_0$, $x_1$, and $x'_0$.

To summarize, two approaches are possible for detection of multi-layer superposition transmission:

Use rk2 LM (with SIC or Turbo-DD if feasible) approach by obtaining LLRs for the bits of the symbol $x=\alpha x_0+\beta x'_0$ using the joint soft-demapper.

Use rk3 lattice search methods for obtaining LLRs of bits of $x_0$, $x_1$, and $x'_0$.

The above SLIC methods can be used by both the near UE and the far UE if the receiver knows the other user's modulation order and the power split information.

The near UE can perform CWIC to cancel far user CW prior to decoding its own CW if the MCS and RNTI information for the far user are known.

IV. LLR Generation for Receiving GNC Symbols

The constellation generated by the mapping above leads to a non-uniform constellation since the constellation points are on an unequally spaced lattice. However, one property of the mapping is that the underlying direct-sum constellation is a ($2^{K_F+K_N}$)-QAM constellation, albeit with non-uniform symbol boundaries. Therefore, the LLR computation logic may be extended for a Gray-encoded ($2^{K_F+K_N}$)-QAM constellation by modifying the decision boundaries.

LLR generation for the m-th bit of the symbol in the non-uniform ($2^{K_F+K_N}$)-QAM constellation is described. Since the LLR is generated jointly, whether this bit belongs to the near user or far user (i.e., desired user or co-scheduled user), can be ignored for the time being.

A. SISO/SIMO Soft Demapper Using Max-Log-MAP Approximation

With respect to SISO/SIMO soft demapper using MLM approximation, common variables $y_{cb}$, $CSI_{cb}$, I and Q can be defined as set forth below in Equations (20)(a) and (20)(b).

$$y_{cb} = \frac{h^H y}{\sqrt{C}} = \frac{1}{\sqrt{C}}\sum_{j=0}^{n_R-1} h_j^* y_j,\ CSI_{cb} = \left|\frac{h}{\sqrt{C}}\right|^2 \quad (20)(a)$$

$$I = \mathrm{Re}(y_{cb}),\ Q = \mathrm{Im}(y_{cb}) \quad (20)(b)$$

The unnormalized symbol can be defined as set forth in Equation (21) below:

$$\dot{x}=\sqrt{C}x \quad (21)$$

The LLR for bit m (ignoring whether this bit belongs to the near user or far user) using max-log-MAP approximation can be defined as set forth below in Equation (22).

$$L_A(b_m) = -\min_{x \in X_m^+} \frac{|y_{cb} - CSI_{cb}\dot{x}|^2}{CSI_{cb}\sigma_n^2} + \min_{x \in X_m^-} \frac{|y_{cb} - CSI_{cb}\dot{x}|^2}{CSI_{cb}\sigma_n^2} \quad (22)$$

As compared to the uniform constellation case, the constant C is no longer fixed but rather is a function of the modulation pair and parameters p and q.

The symbol $x \in S_{p,q}(X_1, X_2)$ belongs to a non-uniform constellation formed by the constellation pair $(X_1, X_2)$.

For even values of m, LLR only depends on I, as shown in Equation (23)(a) below, and for odd values of m, LLR only depends on Q, as shown in Equation (23)(b) below:

$$'I = \frac{1}{\sqrt{C}}(|h|^2 x_I + \mathrm{Re}(h^H n)) \quad (23)(a)$$

$$'Q = \frac{1}{\sqrt{C}}(|h|^2 x_Q + \mathrm{Im}(h^H n)) \quad (23)(b)$$

By defining $$a = CSI_{cb}\ \text{and}\ L_A(b_m)' = \frac{\sigma_n^2}{4}L_A(b_m),$$

Equation (22) can be rewritten as Equation (24):

$$L'_A(b_m) = \frac{\sigma_n^2}{4}\left(-\min_{x \in X_m^+}\frac{(I - a\dot{x}_I)^2}{a\sigma_n^2} + \min_{x \in X_m^-}\frac{(I - a\dot{x}_I)^2}{a\sigma_n^2}\right) \quad (24)$$

$$= -\min_{x \in X_m^+}\frac{(I - a\dot{x}_I)^2}{4a} + \min_{x \in X_m^-}\frac{(I - a\dot{x}_I)^2}{4a}$$

where $x_m^+$ denotes the subset of $S_{p,q}(x_1,x_2)$, such that the m-th bit of each element in the subset is equal to '0'; and $x_m^-$ denotes the subset of $S_{p,q}(X_1,X_2)$ such that the m-th bit of each element in the subset is equal to '1'.

Using this framework, decision boundaries and LLR values can be calculated for SISO/SIMO soft demapping using MLM approximation. The decision boundaries for different bits correspond to a Gray-mapped super-constellation if power allocation satisfies the necessary conditions for maintenance of Gray mapping. See, e.g., Tables 4 and 5 above. For different modulation order pairs, Max-Log-MAP soft demapper expressions can be derived under the assumption that Gray mapping is maintained (with or without bit swapping).

Examples of specific equations, LLR values, and decision boundaries for GNC super-constellations in a rk1 SISO/SIMO transmission are provided in APPENDIX II attached hereto, and in U.S. Prov. Pat. App. Ser. Nos. 62/173,241 and 62/203,818, from which APPENDIX II is derived and the present application claims priority (and which have been incorporated by reference in their entirety).

In another embodiment of the present disclosure, it is shown that the LLR for bit $b_l$ based on max-log-MAP approximation for the approach proposed earlier can be written down in the general form of Equations (25)(a) and (b):

$$L'_A(b_l) = g(p,q)\text{Re}(y_{cb}) + h(p,q) \text{ for } l \text{ even} \quad (25)(a)$$

$$L'_A(b_l) = g(p,q)\text{Im}(y_{cb}) + h(p,q) \text{ for } l \text{ odd} \quad (25)(b)$$

where $g(p,q)$ and $h(p,q)$ are two functions of parameters $p$, $q$, and:

$$y_{cb} = \frac{h^H y}{\sqrt{C}} = \frac{1}{\sqrt{C}} \sum_{j=0}^{n_R - 1} \hat{h}_j y_j \quad (26)$$

Equation (26) is determined based on the received signal vector and the estimated channel state.

B. SISO/SIMO Rank 1 Direct Soft Demapping Using Log-MAP

With respect to rank 1 Log-MAP for SISO/SIMO, a simplification is used; namely, that the number of Euclidean Distances (ED) required for calculating LLR for all of the bits of GNC symbol is equal to $2^{(K_F + K_N)/2 + 1}$ or $2\sqrt{M}$, where $M = 2^{K_F + K_N}$.

Assuming that simplification, the LLR for bit $b_m$ in GNC can be written as Equation (27):

$$L(b_m) = \log \frac{P(b_m = 0 \mid y)}{P(b_m = 1 \mid y)} \quad (27)$$

$$= \log \frac{P(y \mid b_m = 0) P(b_m = 0)}{P(y \mid b_m = 1) P(b_m = 1)}$$

$$= \log \frac{\sum_{x: b_m = 0} P(y \mid x)}{\sum_{x: b_m = 1} P(y \mid x)}$$

$$= \log \frac{\sum_{x: b_m = 0} e^{-\frac{\|y - hx\|^2}{\sigma^2}}}{\sum_{x: b_m = 1} e^{-\frac{\|y - hx\|^2}{\sigma^2}}}$$

where $x \in S_{p,q}(X_1, X_2)$, $X_1$ is the first user's constellation, and $X_2$ is second user's constellation.

Let $S_{p,q}^I(X_1, X_2)$ denote the real-valued set formed by projection of the constellation symbols of $S_{p,q}(X_1, X_2)$ on the I-axis and $S_{p,q}^Q(X_1, X_2)$ denote the real-valued set (ignoring the $\sqrt{-1}$ term) formed by projection of the constellation symbols of $S_{p,q}(X_1, X_2)$ on the Q-axis. Thus, for example, if $X_1 = X_{QPSK}$ and $X_2 = X_{16QAM}$, then:

$$S_{p,q}^I(\chi_1, \chi_2) = S_{p,q}^Q(\chi_1, \chi_2) \quad (28)$$

$$= \{-4p - 3pq, -4p - pq, -4p + pq,$$

$$-4p + 3pq, 4p - 3pq, 4p - pq,$$

$$4p + pq, 4p + 3pq\}$$

Equation (29) below holds for SISO/SIMO:

$$\frac{\|y - hx\|^2}{\sigma^2} = \frac{1}{\sigma^2}\left[\|y\|^2 - \frac{1}{h^H h}(h^H y)^2\right] + \frac{1}{\sigma^2 h^H h}\|h^H y - (h^H h)x\|^2 \quad (29)$$

The first term on the right in the preceding equation $$\left(\frac{1}{\sigma^2}\left[\|y\|^2 - \frac{1}{h^H h}(h^H y)^2\right]\right)$$

does not depend on x. Using the symmetry of constellation points around the I-axis for the set $\{x: b_m = 0\}$ and the set $\{x: b_m = 1\}$ for even m, then for even indexed m:

$$\log \frac{\sum_{x: b_m = 0} e^{-\frac{\|y - hx\|^2}{\sigma^2}}}{\sum_{x: b_m = 1} e^{-\frac{\|y - hx\|^2}{\sigma^2}}} = \log \frac{\sum_{z \in S_{p,q}^I(X_1, X_2): b_m = 0} e^{-\frac{\|\text{Re}\{h^H y\} - (h^H h)z\|^2}{\sigma^2}}}{\sum_{z \in S_{p,q}^I(X_1, X_2): b_m = 1} e^{-\frac{\|\text{Re}\{h^H y\} - (h^H h)z\|^2}{\sigma^2}}} \quad (30)$$

The same simplification and calculation can be made for odd-indexed m. See Eq. (31)(b) below.

The set $\{x: b_m = 0\}$ has $M/2$ elements where $M = 2^{K_F + K_N}$. Therefore, when using the brute force approach, M Euclidean Distances (ED) would need to be computed to find the LLRs. However, the set $\{z \in S_{p,q}^I(X_1, X_2): b_m = 0\}$ has only $\sqrt{M}$ elements. Accordingly, using the simplification above according to an embodiment of the present disclosure, only $2\sqrt{M}$ EDs would need to be computed in order to calculate LLRs for all of the bits of a GNC symbol.

To summarize, the LLRs for rk1 GNC transmission can be computed as Equations (31)(a) and (31)(b) below.

$$L(b_m) = \log \frac{\sum_{z \in S_{p,q}^I(X_1, X_2): b_m = 0} e^{-\frac{\|\text{Re}\{h^H y\} - (h^H h)z\|^2}{\sigma^2}}}{\sum_{z \in S_{p,q}^I(X_1, X_2): b_m = 1} e^{-\frac{\|\text{Re}\{h^H y\} - (h^H h)z\|^2}{\sigma^2}}} \text{ for even } m \quad (31)(a)$$

$$L(b_m) = \log \frac{\sum_{z \in S_{p,q}^Q(X_1, X_2): b_m = 0} e^{-\frac{\|\text{Im}\{h^H y\} - (h^H h)z\|^2}{\sigma^2}}}{\sum_{z \in S_{p,q}^Q(X_1, X_2): b_m = 1} e^{-\frac{\|\text{Im}\{h^H y\} - (h^H h)z\|^2}{\sigma^2}}} \text{ for odd } m \quad (31)(b)$$

C. Rank 2 Log-MAP

The key step in rk2 Log-MAP without prior information is that Max-Log-MAP (MLM) approximation is applied assuming layer 0 to be the soft layer and the hard slicing of $X_1$ is performed as in Equation (32) below:

$$\hat{x}_1(x_0) = \underset{x_1 \in C_1}{\arg\min} |h_1^H(y - h_0 x_0) - h_1^H h_1 x_1|^2 \quad (32)$$

Three options are possible:
1. The cross-layer $x_1$ belongs to a non-uniform M-QAM constellation $S_{p,q}(X_1, X_2)$ and soft layer $X_0$ belongs to a uniform M-QAM constellation.
2. The cross-layer $X_1$ belongs to a uniform M-QAM constellation and soft layer $X_0$ belongs to a non-uniform M-QAM constellation $S_{p,q}(X_1, X_2)$.

3. Both soft layer and cross layer belong to non-uniform M-QAM constellations $S_{p,q}(X_1,X_2)$ and $S_{p,q}(X_3,X_4)$, respectively.

Compared to conventional slicers for uniform M-QAM constellations, the hard slicer proposed herein has modified decision boundaries to handle non-uniform M-QAM constellations. This can be handled as a special case of hard slicing with prior information.

rk2 Log-MAP iterative detection is possible if the UE is provided sufficient information (e.g., MCS, Cell RNTI (C-RNTI), and any other possibly pertinent information) to decode the co-scheduled UE's physical downlink shared channel (PDSCH) codeword. When iterative detection is possible, iterative (turbo) soft interference cancellation is possible.

One of the key steps in rk2 Log-MAP without iterative detection is that the MLM approximation is applied assuming layer 0 to be the soft layer and the hard slicing of $X_1$ is performed as in Equation (33)(a) below:

$$\hat{x}_1(x_0) = \arg\min_{x_1 \in \mathbb{C}_1}\left(\|y - Hx\|^2 - \frac{\sigma^2}{2}\sum_{(m,n)\neq(i,l)}(-1)^{b_{m,n}}L_a(b_{m,n})\right) \quad (33)(a)$$

which is equivalent to Equation (33)(b) below:

$$\hat{x}_1(x_0) = \arg\min_{x_1 \in \mathbb{C}_1}\left(\|y - Hx\|^2 - \frac{\sigma^2}{2}\sum_{n}(-1)^{b_{1,n}}L_a(b_{1,n})\right) \quad (33)(b)$$

V. Control Signalling for GNC

The co-scheduled UEs according to embodiments of the present disclosure need to be informed of one or more of:

1) the type of superposition transmission (e.g., no MUST, 1-layer MUST, or multi-layer MUST),
2) the modulation orders for the constituent users that are co-scheduled, and
3) the power split factor $\alpha_N=1-\alpha_F$ on the precoding vector (or equivalently the demodulation reference signal (DMRS) antenna port) applicable to near/far user PDSCH symbols.

Downlink Control Information (DCI) for Joint LLR or SLIC

As discussed above, in some embodiments, the BS/eNB dynamically (i) decides whether or not MUST is employed; (ii) selects a user pair (or user triplet) and the corresponding MCS(s); and (iii) if MUST is employed, determines the suitable $\alpha_N=1-\alpha_F$ power split factor based on the MCS selected. In such embodiments, the needed pieces of information could be transmitted to the UEs as DCI over the physical downlink control channel (PDCCH)/enhanced physical downlink control channel (EPDCCH).

In MUST schemes, the range of values of $\alpha_N=1-\alpha_F$ that is of interest is determined based on p,q values. Under the GNC definition, p=1 is always true since it is scaled out by the normalization factor as described above. Thus, the eNB only needs to signal one of (1) $\alpha_N$, (2) $\alpha_F$, and (3) q values. Once the modulation orders and the user ranks are indicated, and one of (1) $\alpha_N$, (2) $\alpha_F$, and (3) q values are provided, the receiving UE will be able to deduce the other parameters.

When provided to the UE via control signaling, $\alpha_N$ or $\alpha_F$ can be selected from a small set of feasible values. For example, if system simulations determine that the relevant range for $\alpha_F$ is $\alpha_F \in [0.2,1)$, this range set can be reduced to a finite alphabet set, such as, for example, {0.2,0.3,0.4,0.5, 0.6,0.7,0.8,0.9} which includes the different ratios necessary to obtain the non-uniform $S_{p,q}(X_1, X_2)$ constellations of interest. Similarly, the q value, when provided to the UE via control signaling, can be transmitted in DCI once again based on a finite alphabet.

As discussed above, when $\alpha_F$ enters a certain range, Gray mapping is violated and the BS/eNB scheduler may decide to use Direct Symbol Mapping (DSM) rather than GNC mapping. In such a scenario, the BS/eNB can send an indication in DCI to indicate whether it is using, in a given TTI, (1) GNC mapping without bit swapping; (2) GNC mapping with bit swapping; or (3) DSM. The UE can use this information to appropriately configure its detecting, decoding, and processing, based on the type of mapping used.

In LTE Rel-12, DCI Format 2C has a three-bit field indicating "antenna port(s), scrambling identity and number of layers". See, e.g., 3GPP TS 36.212, v. 12.0.0 (2013-12), which is hereby incorporated by reference in its entirety, § 5.3.3.1.5C. In addition, 3GPP TS 36.211 v. 12.5.0 (2015-03) is hereby incorporated by reference in its entirety. This three-bit field, which can thus take the values 0-7, indicates the messages as shown in Table 5 below, which is based on Table 5.3.3.1.5C-1 in TS 36.212:

TABLE 5

| DCI Format 2C "Antenna port(s), . . ." Field Values | | | |
|---|---|---|---|
| One Codeword: Codeword 0 enabled, Codeword 1 disabled | | Two Codewords: Codeword 0 enabled, Codeword 1 enabled | |
| value | Message | value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Since MCS is independently controllable on ports 7 and 8 during 2 layer transmission and on ports 7/8 and 9/10 during 4 layer transmission, when MUST is employed (i.e., with two users), the possibilities are that:

1) in 1 layer transmission, the other user is co-scheduled on port 7;
2) in 2 layer transmission, the other user is co-scheduled on port 7 or port 7/8;
3) in 3 layer transmission, the other user is co-scheduled on port 7 or port 7/8 or port 7/8/9; and
4) in 4 layer transmission, the other user is co-scheduled on port 7 or port 7/8 or port 7/8/9 or port 7/8/9/10.

Accordingly, the three-bit field indicating "antenna port(s), . . . " in DCI Format 2C already contains the information to convey the co-scheduled user transmission state and the number of transmission layers. One of the signaling states, such as, for example, the RESERVED message for field value=7 (for one codeword) can be used to indicate whether there is a MUST transmission.

The above-described signalling is more general than what is needed for MUST Scenario 1 and MUST Scenario 2. In Table 5, nSCID allocation by the eNb is fully flexible for the user and the co-scheduled user.

At least the modulation order(s) for the co-scheduled user's one or more layers also needs to be signaled by the eNb or blindly estimated by the UE. For example, up to two MCSs (which determine the modulation orders for up to 4 layers) can be indicated, but this is unnecessary for SLIC, which does not need to know the coding rates so the modulation order is enough. Instead, the two modulation orders (for up to 4 layers) can be directly signaled. Since there are 4 modulation orders in LTE Rel-12 {QPSK, 16QAM, 64QAM, 256QAM}, only 2 bits are needed to indicate the modulation order if it is signaled by the eNb. Accordingly, assuming K=2, a maximum of 2*2=4 bits are needed to indicate the co-scheduled user modulation on all of its layers. More generally, *2 bits are needed for each UE.

In summary, in one embodiment of the present disclosure, the MUST control information which needs to be blindly estimated by the UE or signaled by, for example, DCI, should include:
1) a MUST or no MUST indication;
2) one of (i) $\alpha_N$, (ii) $\alpha_F$, and (iii) q values;
3) 1-bit indication whether GNC mapping or DSM is used in a TTI;
4) co-scheduled user's antenna port(s), scrambling identity, and number of layers indication; and
5) co-scheduled user's modulation order (pair) for SLIC or MCS (pair) indication for CWIC.

Downlink Control Information (DCI) for CWIC

If the near UE needs to be able to perform CWIC, the co-scheduled UE MCS/TB information needs to be signaled in DCI in addition to the information elements described above.

In TS 36.212, for co-scheduled user transport block 1:
Modulation and coding scheme—5 bits
New data indicator—1 bit
Redundancy version—2 bits
In TS 36.212, for co-scheduled user transport block 2:
Modulation and coding scheme—5 bits
New data indicator—1 bit
Redundancy version—2 bits The signal RNTI information (such as, for example, C-RNTI, and Semi-persistent C-RNTI (SPS-C-RNTI)) for the co-scheduled user can be signaled in DCI. However, this will likely lead to a large overhead. Instead the RNTI information and the associated co-scheduler user index can be indicated via radio resource control (RRC). The DCI can include a co-scheduled user index pointer, which points to the RNTI information sent ahead of time in RRC signaling.

Depending on the embodiment of the present disclosure, steps and/or operations in accordance with the present disclosure may occur in a different order, or in parallel, or concurrently for different epochs, or a combination of the same, in different embodiments, as would be understood by one of ordinary skill in the art. Similarly, as would be understood by one of ordinary skill in the art, FIGS. 4, 5, and 6 are simplified representations of the actions performed, and real-world implementations may perform the actions in a different order or by different ways or means. Similarly, as simplified representations, FIGS. 4, 5, and 6 do not show other required steps as these are known and understood by one of ordinary skill in the art and not pertinent and/or helpful to the present description.

Depending on the embodiment of the present disclosure, some or all of the steps and/or operations may be implemented or otherwise performed, at least in part, on a portable device. "Portable device" as used herein refers to any portable, mobile, or movable electronic device having the capability of receiving wireless signals, including, but not limited to, multimedia players, communication devices, computing devices, navigating devices, etc. Thus, mobile devices include, but are not limited to, laptops, tablet computers, Portable Digital Assistants (PDAs), mp3 players, handheld PCs, Instant Messaging Devices (IMD), cellular telephones, Global Navigational Satellite System (GNSS) receivers, watches, cameras or any such device which can be worn and/or carried on one's person. "User Equipment" or "UE" as used herein corresponds to the usage of that term in the 3GPP LTE/LTE-A protocols, but is not in any way limited by the 3GPP LTE/LTE-A protocols. Moreover, "User Equipment" or "UE" refers to any type of device, including portable devices, which acts as a wireless receiver.

Depending on the embodiment of the present disclosure, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof. Moreover, the functionality of any "module" discussed herein may be implemented in software, firmware, hardware, and/or any combination thereof.

The one or more non-transitory computer-readable media and/or means for implementing/performing one or more operations/steps/modules of embodiments of the present disclosure may include, without limitation, application-specific integrated circuits ("ASICs"), standard integrated circuits, controllers executing appropriate instructions (including microcontrollers and/or embedded controllers), field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced in any computer system configuration.

Thus, the term "non-transitory computer-readable medium" as used herein refers to any medium that comprises the actual performance of an operation (such as hardware circuits), that comprises programs and/or higher-level instructions to be provided to one or more processors for performance/implementation (such as instructions stored in a non-transitory memory), and/or that comprises machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read, or any other non-transitory medium from which a computer instruction can be read.

While the invention has been shown and described with reference to certain embodiments thereof, it will be understood by those skilled in the art that various changes in form and detail may be made therein without departing from the spirit and scope of the invention as defined by the appended claims.

APPENDIX I

TABLE AI-1

| (QPSK, QPSK) |
|---|
| (QPSK, QPSK) = 16-QAM Super-constellation = $S_{p,q}(X_{QPSK}, X_{QPSK})$ |
| Bit Mapping |
| $(b_0, b_1) = (d_0^F, d_1^F)$<br>$(b_2, b_3) = (d_0^N, d_1^N)$ |
| $x = \frac{1}{\sqrt{C}}\{p(1-2b_0)[2-q(1-2b_2)] + jp(1-2b_1)[2-q(1-2b_3)]\}$ |
| Symbol Mapping |
| $x = \frac{1}{\sqrt{C}}\{p(1-2d_0^F)[2-q(1-2d_0^N)] + jp(1-2d_1^F)[2-q(1-2d_1^N)]\}$ |
| → Setting p = q = 1 or equivalently $\alpha_F > 0.8$ results in the traditional 16QAM constellation |
| Constraints for Scenario 1 (scalar/1-layer): |
| 1) $2p^2(4 + q^2) = C$ which arises from unit constellation power and |
| 2) $\frac{q^2}{4} = \frac{1-\alpha_F}{\alpha_F}$, which arises from the power split requirement between $(b_0, b_1)$ bits and $(b_2, b_3)$ bits. |
| Constraints for Scenario 2 (two-layer): |
| 1) $2p^2(4 + q^2) = 0.5C (1 + \alpha_F)$ and |
| 2) $\frac{q^2}{4} = \frac{1-\alpha_F}{2\alpha_F}$. |

APPENDIX I

TABLE AI-2

| (16-QAM, QPSK) |
|---|
| (16-QAM, QPSK) = 64-QAM Super-constellation = $S_{p,q}(X_{16QAM}, X_{QPSK})$ |
| Bit Mapping |
| $(b_0, b_2, b_3, b_4) = (d_0^F, d_2^F, d_3^F, d_4^F)$<br>$(b_4, b_5) = (d_0^N, d_1^N)$ |
| Symbol Mapping |
| $x = \frac{1}{\sqrt{C}}\{(1-2d_0^F)p[4-(1-2d_2^F)[2-q(1-2d_0^N)]] +$ |

TABLE AI-2-continued

| (16-QAM, QPSK) |
|---|
| (16-QAM, QPSK) = 64-QAM Super-constellation = $S_{p,q}(X_{16QAM}, X_{QPSK})$ |
| $j(1-2d_1^F)p[4-(1-2d_3^F)[2-q(1-2d_1^N)]]\}$ |
| → Setting p = q = 1 or equivalently $\alpha_F = 20/21$ results in the traditional 64QAM constellation. |
| Constraints for Scenario 1 (scalar/1-layer): |
| 1) $2p^2(20 + q^2) = C$ which arises from unit constellation power and |
| 2) $\frac{q^2}{20} = \frac{1-\alpha_F}{\alpha_F}$, which arises from the power split requirement between $(b_0, b_1, b_2, b_3)$ bits and $(b_4, b_5)$ bits. |
| Constraints for Scenario 2 (two-layer): |
| 1) $2p^2(20 + q^2) = 0.5C (1 + \alpha_F)$ and |
| 2) $\frac{q^2}{20} = \frac{1-\alpha_F}{\alpha_F}$. |

APPENDIX I

TABLE AI-3

| (QPSK, 16-QAM) |
|---|
| (QPSK, 16-QAM) = 64-QAM Super-Constellation = $S_{p,q}(X_{QPSK}, X_{16QAM})$ |
| Bit Mapping |
| $(b_0, b_1) = (d_0^F, d_1^F)$<br>$(b_2, b_3, b_4, b_5) = (d_0^N, d_1^N, d_2^N, d_3^N)$ |
| Symbol Mapping |
| $x = \frac{1}{\sqrt{C}}\{(1-2d_0^F)p[4-q(1-2d_0^N)[2-(1-2d_2^N)]] +$<br>$j(1-2d_1^F)p[4-q(1-2d_1^N)[2-(1-2d_3^N)]]\}$ |
| → Setting p = q = 1 or equivalently $\alpha_F = 16/21$ results in the traditional 64QAM constellation. |
| For Scenario 1 (scalar/1-layer): |
| 1) $2p^2(16 + 5q^2) - C$ which arises from unit constellation power, and |
| 2) $\frac{10q^2}{32} = \frac{1-\alpha_F}{\alpha_F}$ which arises from the power split requirement between $(b_0, b_1)$ bits and $(b_2, b_3, b_4, b_5)$ bits. |
| For Scenario 2 (two-layer): |
| 1) $2p^2(16 + 5q^2) - 0.5 C(1 + \alpha_F)$ which arises from unit constellation power, and |
| 2) $\frac{10q^2}{32} = \frac{1-\alpha_F}{2\alpha_F}$ which arises from the power split requirement between $(b_0, b_1)$ bits and $(b_2, b_3, b_4, b_5)$ bits. |

APPENDIX I

TABLE AI-4

(16-QAM, 16-QAM)
(16-QAM, 16-QAM) = 256-QAM Super-Constellation = $S_{p,q}(X_{16QAM}, X_{16QAM})$

Bit Mapping $(b_0, b_1, b_2, b_3) = (d_0^F, d_1^F, d_2^F, d_3^F)$
$(b_4, b_5, b_6, b_7) = (d_0^N, d_1^N, d_2^N, d_3^N)$

Symbol Mapping $$x = \frac{1}{\sqrt{C}}\{p(1-2d_0^F)[8-(1-2d_2^F)[4-q(1-2d_0^N)[2-(1-2d_2^N)]]] + jp(1-2d_1^F)[8-(1-2d_3^F)[4-q(1-2d_1^N)[2-(1-2d_3^N)]]]\}$$

→ Setting $p = q = 1$ or equivalently $\alpha_F = 16/21$ results in the traditional 256QAM constellation.

For Scenario 1 (scalar/1-layer):

1) $2p^2(80 + 5q^2) = C$ which arises from unit constellation power, and

2) $\frac{q^2}{10} = \frac{1-\alpha_F}{\alpha_F}$ which arises from the power split requirement between $(b_0, b_1, b_2, b_3)$ bits and $(b_4, b_5, b_4, b_5)$ bits.

For Scenario 2 (two-layer):

1) $2p^2(80 + 3q^2) = 0.5C(1 + \alpha_F)$ which arises from unit constellation power, and 2) $\frac{q^2}{10} = \frac{1-\alpha_F}{2\alpha_F}$ which arises from the power split requirement between $(b_0, b_1, b_2, b_3)$ bits and $(b_4, b_5, b_4, b_5)$ bits.

APPENDIX I

TABLE AI-5

(64-QAM, QPSK)
(64-QAM, QPSK) = 256-QAM Super-Constellation = $S_{p,q}(X_{64QAM}, X_{QPSK})$

Bit Mapping $(b_0, b_1, b_2, b_3, b_4, b_5) = (d_0^F, d_1^F, d_2^F, d_3^F, d_4^F, d_5^F)$
$(b_6, b_7) = (d_0^N, d_1^N)$

Symbol Mapping $$x = \frac{1}{\sqrt{C}}\{p(1-2d_0^F)[8-(1-2d_2^F)[4-(1-2d_4^F)[2-q(1-2d_0^N)]]] + jp(1-2d_1^F)[8-(1-2d_3^F)[4-(1-2d_5^F)[2-q(1-2d_1^N)]]]\}$$

→ Setting $p = q = 1$ or equivalently $\alpha_F = 84/85$ results in the traditional 256QAM constellation.

For Scenario 1 (scalar/1-layer):

1) $2p^2(84 + q^2) = C$ which arises from unit constellation power and

2) $\frac{q^2}{84} = \frac{1-\alpha_F}{\alpha_F}$ which arises from the power split requirement between $(b_0, b_1, b_2, b_3, b_4, b_5)$ bits and $(b_6, b_7)$ bits.

TABLE AI-5-continued

(64-QAM, QPSK)
(64-QAM, QPSK) = 256-QAM Super-Constellation = $S_{p,q}(X_{64QAM}, X_{QPSK})$

For Scenario 2 (two-layer):

1) $2p^2(84 + q^2) = 0.3C(1 + \alpha_F)$ which arises from unit constellation power, and 2) $\frac{q^2}{84} = \frac{1-\alpha_F}{2\alpha_F}$ which arises from the power split requirement between $(b_0, b_1, b_2, b_3, b_4, b_5)$ bits and $(b_6, b_7)$ bits.

APPENDIX I

TABLE AI-6

(QPSK, 64-QAM)
(QPSK, 64-QAM) = 256-QAM Super-Constellation = $S_{p,q}(X_{QPSK}, X_{64QAM})$

Bit Mapping $(b_0, b_1) = (d_0^F, d_1^F)$
$(b_2, b_3, b_4, b_5, b_6, b_7) = (d_0^N, d_1^N, d_2^N, d_3^N, d_4^N, d_5^N)$

Symbol Mapping $$x = \frac{1}{\sqrt{C}}\{p(1-2d_0^F)[8-q(1-2d_0^N)[4-(1-2d_2^N)[2-(1-2d_4^N)]]] + jp(1-2d_1^F)[8-q(1-2d_1^N)[4-(1-2d_3^N)[2-(1-2d_5^N)]]]\}$$

→ Setting $p = q = 1$ or equivalently $\alpha_F = 64/85$ results in the traditional 256QAM constellation.

For Scenario 1 (scalar/1-layer):

1) $2p^2(64 + 21q^2) = C$ which arises from unit constellation power and

2) $\frac{21q^2}{64} = \frac{1-\alpha_F}{\alpha_F}$ which arises from the power split requirement between $(b_0, b_1, b_2, b_3, b_4, b_5)$ bits and $(b_6, b_7)$ bits.

For Scenario 2 (two-layer):

1) $2p^2(64 + 21q^2) = 0.5C(1 + \alpha_F)$ which arises from unit constellation power and 2) $\frac{21q^2}{64} = \frac{1-\alpha_F}{2\alpha_F}$ which arises from the power split requirement between $(b_0, b_1, b_2, b_3, b_4, b_5)$ bits and $(b_6, b_7)$ bits.

APPENDIX I

TABLE AI-7

(64-QAM, 16-QAM)
(64-QAM, 16-QAM) = 1024-QAM Super-Constellation = $S_{p,q}(X_{64QAM}, X_{16QAM})$

Bit Mapping $(b_0, b_1, b_2, b_3, b_4, b_5) = (d_0^F, d_1^F, d_2^F, d_3^F, d_4^F, d_5^F)$
$(b_6, b_7, b_8, b_9) = (d_0^N, d_1^N, d_2^N, d_3^N)$ TABLE AI-7-continued (64-QAM, 16-QAM)
(64-QAM, 16-QAM) = 1024-QAM Super-Constellation =
$S_{p,q}(X_{64QAM}, X_{16QAM})$ $$x = \frac{1}{\sqrt{682}} \{(1 - 2b_0)[16 - (1 - 2b_2)[8 - (1 - 2b_4)[4 - (1 - 2b_6)[2 - (1 - 2b_8)]]]] + j(1 - 2b_1)[16 - (1 - 2b_3)[8 - (1 - 2b_5)[4 - (1 - 2b_7)[2 - (1 - 2b_9)]]]]\}.$$

Symbol Mapping $$x = \frac{1}{\sqrt{C}} \{p(1 - 2d_0^F)[16 - (1 - 2d_2^F)[8 - (1 - 2d_4^F)[4 - q(1 - 2d_0^N)[2 - (1 - 2d_2^N)]]]] + jp(1 - 2d_1^F)[16 - (1 - 2d_3^F)[8 - (1 - 2d_5^F)[4 - q(1 - 2d_1^N)[2 - (1 - 2d_3^N)]]]]\}$$

→ Setting $p = q = 1$ or equivalently $a_F = 5/341$ results in the traditional 1024QAM constellation.

For Scenario 1 (scalar/1-layer):

1) $2p^2(336 + 5q^2) = C$ which arises from unit constellation power and

2) $\frac{5q^2}{336} = \frac{1 - \alpha_F}{\alpha_F}$ which arises from the power split requirement between $(b_0, b_1, b_2, b_3, b_4, b_5)$ bits and $(b_6, b_7, b_8, b_9)$ bits.

For Scenario 2 (two-layer):

1) $2p^2(336 + 5q^2) + 0.5C(1\alpha_F)$, which arises from unit constellation power, and 2) $\frac{5q^2}{336} = \frac{1 - \alpha_F}{\alpha_F}$ which arises from the power split requirement between $(b_0, b_1, b_2, b_3, b_4, b_5)$ bits and $(b_6, b_7, b_8, b_9)$ bits.

APPENDIX I

TABLE AI-8

(16-QAM, 64-QAM)
(16-QAM, 64-QAM) = 1024-QAM Super-Constellation =
$S_{p,q}(X_{16QAM}, X_{64QAM})$ Bit Mapping $(b_0, b_1, b_2, b_3) = (d_0^F, d_1^F, d_2^F, d_3^F)$
$(b_4, b_5, b_6, b_7, b_8, b_9) = (d_8^N, d_1^N, d_2^N, d_3^N, d_4^N, d_5^N)$ Symbol Mapping $$x = \frac{1}{\sqrt{C}} \{p(1 - 2d_0^F)[16 - (1 - 2d_2^F)[8 - q(1 - 2d_0^N)[4 - (1 - 2d_2^N)[2 - (1 - 2d_4^N)]]]] + jp(1 - 2d_1^F)[16 - (1 - 2d_3^F)[8 - q(1 - 2d_1^N)[4 - (1 - 2d_3^N)2 - (1 - 2d_5^N)]]]]\}$$

→ Setting $p = q = 1$ or equivalently $a_F = 21/341$ results in the traditional 1024QAM constellation.

For Scenario 1 (scalar/1-layer):

1) $2p^2(320 + 21q^2) = C$, which arises from unit constellation power, and

TABLE AI-8-continued (16-QAM, 64-QAM)
(16-QAM, 64-QAM) = 1024-QAM Super-Constellation =
$S_{p,q}(X_{16QAM}, X_{64QAM})$ 2) $\frac{21q^2}{320} = \frac{1 - \alpha_F}{\alpha_F}$, which arises from the power split requirement between $(b_0, b_1, b_2, b_3)$ bits and $(b_4, b_5, b_6, b_7, b_8, b_9)$ bits.

For Scenario 2 (two-layer):

1) $2p^2(320 + 21q^2) = 0.5C(1+\alpha_F)$, which arises from unit constellation power, and 2) $\frac{21q^2}{320} = \frac{1 - \alpha_F}{\alpha_F}$, which arises from the power split requirement between $(b_0, b_1, b_2, b_3)$ bits and $(b_4, b_5, b_6, b_7, b_8, b_9)$ bits.

APPENDIX I

TABLE AI-9

(64-QAM, 64-QAM)
(64-QAM, 64-QAM) = 4096-QAM Super-Constellation =

Bit Mapping $(b_0, b_1, b_2, b_3, b_4, b_5) = (d_0^F, d_1^F, d_2^F, d_3^F, d_4^F, d_5^F)$
$(b_6, b_7, b_8, b_9, b_{10}, b_{11}) = (d_0^N, d_1^N, d_2^N, d_3^N, d_4^N, d_5^N)$ $$x = \frac{1}{\sqrt{2730}} \{(1 - 2b_0)[32 - (1 - 2b_2)[16 - (1 - 2b_4)[8 - (1 - 2b_6)[4 - (1 - 2b_8)[2 - (1 - 2b_{10})]]]]] + j(1 - 2b_1)[32 - (1 - 2b_3)[16 - (1 - 2b_5)[8 - (1 - 2b_7)[4 - (1 - 2b_9)[2 - (1 - 2b_{11})]]]]]\}$$

Symbol Mapping $$x = \frac{1}{\sqrt{C}} \{p(1 - 2d_0^F)[32 - (1 - 2d_2^F)[16 - (1 - 2d_4^F)[8 - q(1 - 2d_0^N)[4 - (1 - 2d_2^N)[2 - (1 - 2d_4^N)]]]]] + jp(1 - 2d_1^F)[32 - (1 - 2d_3^F)[16 - (1 - 2d_5^F)[8 - q(1 - 2d_1^N)[4 - (1 - 2d_3^N)[2 - (1 - 2d_5^N)]]]]]\}$$

→ Setting $p = q = 1$ or equivalently $a_F = 21/1365$ results in the traditional 4096-QAM constellation For Scenario 1 (scalar/1-layer):

1) $2p^2(1344 + 21q^2) = C$, and

2) $\frac{21q^2}{1344} = \frac{1 - \alpha_F}{\alpha_F}$, which arises from the power split requirement between $(b_0, b_1, b_2, b_3, b_4, b_5)$ bits and $(b_4, b_5, b_6, b_7, b_8, b_9)$ bits.

For Scenario 2 (two-layer):

1) $2p^2(1344 + 21q^2) = 0.5C(1 + \alpha_F)$, and

2) $\frac{21q^2}{1344} = \frac{1 - \alpha_F}{\alpha_F}$, which arises from the power split requirement between $(b_0, b_1, b_2, b_3, b_4, b_5)$ bits and $(b_4, b_5, b_6, b_7, b_8, b_9)$ bits.

APPENDIX II

Max-Log-MAP Soft Demapper Expressions

TABLE AII-1

Non-uniform (QPSK, QPSK) = 16-QAM Super-constellation

$$S_{p,q}(X_{QPSK}, X_{QPSK})$$

$$L'_A(b_0) = -\min\left\{\frac{(I-a(2p-q))^2}{4a}, \frac{(I-a(2p-q))^2}{4a}\right\} + \min\left\{\frac{(I+a(2p-q))^2}{4a}, \frac{(I+a(2p+q))^2}{4a}\right\}$$

$$L'_A(b_2) = -\min\left\{\frac{(I-a(2p-q))^2}{4a}, \frac{(I+a(2p-q))^2}{4a}\right\} + \min\left\{\frac{(I-a(2p+q))^2}{4a}, \frac{(I+a(2p+q))^2}{4a}\right\}$$

$L_A'(b_0)$ and $L_A'(b_2)$ as a function of $I = \text{Re}(\gamma_{cb})$ for (QPSK, QPSK)

| I value | $L_A'(b_0)$ | $L_A'(b_2)$ |
|---|---|---|
| $I > 2ap$ | $2Ip - 2pqa$ | $2apq - qI$ |
| $0 < I \leq 2ap$ | $I(2p - q)$ | $2apq - Iq$ |
| $-2ap < I \leq 0$ | $I(2p - q)$ | $Iq - 2apq$ |
| $I \leq -2ap$ | $2Ip - 2pqa$ | $aI - 2apq$ |

$L_A'(b_1)$ and $L_A'(b_3)$ as a function of $(Q = \text{Im}(\gamma_{cb}))$ for (QPSK, QPSK)

| Q value | $L_A'(b_1)$ | $L_A'(b_3)$ |
|---|---|---|
| $Q > 2ap$ | $2Qp - 2pqa$ | $2apq - qQ$ |
| $0 < Q \leq 2ap$ | $Q(2p - q)$ | $2apq - Qq$ |
| $-2ap < Q \leq 0$ | $Q(2p - q)$ | $Qq - 2apq$ |
| $Q \leq -2ap$ | $2Qp - 2pqa$ | $qQ - 2apq$ |

TABLE AII-2

Non-uniform (16-QAM, QPSK) = 64-QAM Super-constellation

$$S_{p,q}(X_{16QAM}, X_{QPSK})$$

$$L'_A(b_0) = -\min\left\{\frac{(I-(2p-q)a)^2}{4a}, \frac{(I-(2p+q)a)^2}{4a}, \frac{(I-(6p-q)a)^2}{4a}, \frac{(I-(6p+q)a)^2}{4a}\right\} + \min\left\{\frac{(I+(2p-q)a)^2}{4a}, \frac{(I+(2p+q)a)^2}{4a}, \frac{(I+(6p-q)a)^2}{4a}, \frac{(I+(6p+q)a)^2}{4a}\right\}$$

$$L'_A(b_2) = -\min\left\{\frac{(I-(2p-q)a)^2}{4a}, \frac{(I-(2p+q)a)^2}{4a}, \frac{(I+(2p-q)a)^2}{4a}, \frac{(I+(2p+q)a)^2}{4a}\right\} + \min\left\{\frac{(I-(6p-q)a)^2}{4a}, \frac{(I-(6p+q)a)^2}{4a}, \frac{(I+(6p-q)a)^2}{4a}, \frac{(I+(6p+q)a)^2}{4a}\right\}$$

$$L'_A(b_4) = -\min\left\{\frac{(I-(2p+q)a)^2}{4a}, \frac{(I-(6p-q)a)^2}{4a}, \frac{(I+(2p+q)a)^2}{4a}, \frac{(I+(6p-q)a)^2}{4a}\right\} + \min\left\{\frac{(I-(2p-q)a)^2}{4a}, \frac{(I-(6p+q)a)^2}{4a}, \frac{(I+(2p-q)a)^2}{4a}, \frac{(I+(6p+q)a)^2}{4a}\right\}$$

$L_A'(b_0)$, $L_A'(b_2)$ and $L_A'(b_4)$ as a function of $I$ for (16QAM, QPSK)

| I value | $L_A'(b_0)$ | $L_A'(b_2)$ | $L_A'(b_4)$ |
|---|---|---|---|
| $I > 6ap$ | $4Ip - ap(8 + 4q)$ | $ap(8 + 2q) - 2Ip$ | $6apq - Iq$ |
| $4ap < I \leq 6ap$ | $(4p - q)(I - 2ap)$ | $(2p - q)(4pa - I)$ | $6apq - Iq$ |
| $2ap < I \leq 4ap$ | $2p(I - qa)$ | $(2p - q)(4pa - I)$ | $Iq - 2pqa$ |
| $0 < I \leq 2ap$ | $Ip$ | $2ap(4p - q) - 2Ip$ | $Iq - 2pqa$ |
| $-2ap < I \leq 0$ | $Ip$ | $2ap(4p - q) + 2Ip$ | $-Iq - 2pqa$ |
| $-4ap < I \leq -2ap$ | $2p(I + qa)$ | $(2p - q)(4pa - I)$ | $-Iq - 2pqa$ |
| $-6ap < I \leq -4ap$ | $(4p - q)(I + 2ap)$ | $(2p - q)(4pa + I)$ | $6apq + Iq$ |
| $I \leq -6ap$ | $4Ip + ap(8 + 4q)$ | $ap(8 + 2q) + 2Ip$ | $6apq + Iq$ |

APPENDIX II

Max-Log-MAP Soft Demapper Expressions

TABLE AII-3

Non-uniform (QPSK, 16-QAM) = 64-QAM Super-constellation

$$S_{p,q}(X_{QPSK}, X_{16QAM})$$

$$L'_A(b_0) = -\min\left\{\frac{(I-(4p-3q)a)^2}{4a}, \frac{(I-(4p-q)a)^2}{4a}, \frac{(I-(4p+q)a)^2}{4a}, \frac{(I-(4p+3q)a)^2}{4a}\right\} + \min\left\{\frac{(I+(4p-3q)a)^2}{4a}, \frac{(I+(4p-q)a)^2}{4a}, \frac{(I+(4p+q)a)^2}{4a}, \frac{(I+(4p+3q)a)^2}{4a}\right\}$$

$$L'_A(b_2) = -\min\left\{\frac{(I-(4p-3q)a)^2}{4a}, \frac{(I-(4p-q)a)^2}{4a}, \frac{(I+(4p-3q)a)^2}{4a}, \frac{(I+(4p-q)a)^2}{4a}\right\} + \min\left\{\frac{(I-(4p+q)a)^2}{4a}, \frac{(I-(4p+3q)a)^2}{4a},$$

TABLE AII-3-continued

Non-uniform (QPSK, 16-QAM) = 64-QAM Super-constellation $$L'_A(b_2) = -\min\left\{\frac{(I-(4p-q)a)^2}{4a}, \frac{(I-(4p+q)a)^2}{4a}, \frac{(I+(4p-q)a)^2}{4a}, \frac{(I+(4p+q)a)^2}{4a}, \frac{(I+(4p+3q)a)^2}{4a}\right\}$$
$$+ \min\left\{\frac{(I-(4p-3q)a)^2}{4a}, \frac{(I-(4p+3q)a)^2}{4a}, \frac{(I+(4p-3q)a)^2}{4a}, \frac{(I+(4p+3q)a)^2}{4a}\right\}$$

$L_A'(b_0)$, $L_A'(b_4)$ as a function of I for (QPSK, 16QAM)

| I value | $L_A'(b_0)$ | $L_A'(b_2)$ | $L_A'(b_4)$ |
|---|---|---|---|
| $I > (4p + 2q)a$ | $4Ip - 12pqa$ | $2aq(q + 4p) - 2Iq$ | $2aq(2p + q) - Iq$ |
| $4ap < I \leq (4p + 2q)a$ | $(4p - q)(I - 2aq)$ | $4apq - Iq$ | $2ap(2p + q) - Iq$ |
| $(4p - 2q)a < I \leq 4ap$ | $(2p - q)(2I - 2aq)$ | $4apq - Iq$ | $Iq - 2aq(2p - q)$ |
| $0 < I \leq (4p - 2q)a$ | $I(4p - 3q)$ | $2qa(4p - q) - 2Iq$ | $Iq - 2aq(2p - q)$ |
| $-(4p - 2q)a < I \leq 0$ | $I(4p - 3q)$ | $2qa(4p - q) + 2Iq$ | $-Iq - 2aq(2p - q)$ |
| $-4ap < I \leq -(4p - 2q)a$ | $(2p - q)(2I + 2aq)$ | $4apq + Iq$ | $-Iq - 2aq(2p - q)$ |
| $-(4p + 2q)a < I \leq -4ap$ | $(4p - q)(I + 2aq)$ | $4apq + Iq$ | $2aq(2p + q) + Iq$ |
| $I \leq -(4p + 2q)a$ | $4Ip + 12pqa$ | $2aq(q + 4p) + 2Iq$ | $2aq(2p + q) + Iq$ |

What is claimed is:

1. A method of selecting a superposition constellation comprising constellations of two or more user equipments (UEs), comprising:
    determining which type of superposition constellation (super-constellation) to generate based at least on a power ratio among the two or more UEs, wherein one type of super-constellation is a Gray-mapped Non-uniform-capable Constellation (GNC), in which both the constituent constellations of the two or more UEs and a GNC super-constellation itself are Gray-mapped; and
    generating the determined type of superposition constellation,
    wherein the determined type of superposition constellation is the GNC super-constellation,
    wherein generating the GNC super-constellation comprises mapping symbols in accordance with parameters p and q, which are positive real-valued numbers, of the super-constellation,
    wherein q is inserted into a symbol mapping equation for the super-constellation symbols and is used to maintain a target power split between the two or more UEs, and
    wherein p relates to unit constellation power and is applied to both a real part and an imaginary part of the symbol mapping equation for the super-constellation symbols.

2. The method of claim 1, wherein determining which type of super-constellation to generate comprises:
    determining whether to perform bit-swapping among the two or more UEs in the super-constellation.

3. The method of claim 1, wherein determining which type of super-constellation to generate is also based on at least one of target throughput, target Block Error Rate (BLER), Modulation and Coding Scheme (MCS) of at least one of the two or more UEs, and the Multiple Input Multiple Output (MIMO) rank of at least one of the two or more UEs.

4. The method of claim 1, wherein determining which type of super-constellation to generate comprises:
    finding the type of super-constellation in a look-up table (LUT).

5. The method of claim 1, wherein, when the GNC super-constellation is determined, generating the GNC super-constellation further comprises:
    finding one or more parameters of the GNC super-constellation in a look-up table (LUT).

6. The method of claim 1, wherein the values of p and q are constrained by the constituent constellations of the two or more UEs and a superposition environment of the super-constellation.

7. The method of claim 1, wherein when p=q=1, distances between the super-constellation points are uniform.

8. The method of claim 1, wherein, when the two or more UEs comprise a near UE with constellation modulation order $N_n$ and a far UE with constellation modulation order $N_f$, a super-constellation modulation order is represented as:

$$N_s = N_n * N_f,$$

wherein the symbol mapping equation for super-constellation symbol x is represented as:

$$x = \{\sqrt{C}/p[\text{real part}] + j[\text{imaginary part}]\}, j = \sqrt{-1},$$

where C is a power constraint value.

9. The method of claim 1, wherein, when the two or more UEs are a far and a near UE, both using Quaternary Phase Key Shifting (QPSK) modulation, the result is a 16-QAM (Quadrature Amplitude Modulation) super-constellation and the symbol mapping process can be represented as:

$$x = \frac{1}{\sqrt{C}}\{p(1 - 2b_0)[2 - q(1 - 2b_2)] + jp(1 - 2b_1)[2 - q(1 - 2b_3)]\}$$

where C is a power constraint value.

10. The method of claim 1, wherein the two or more UEs are a far and a near UE and wherein:
    when the far UE uses 16-QAM (Quadrature Amplitude Modulation) and the near UE uses Quaternary Phase Key Shifting (QPSK) modulation, the result is a 64-QAM super-constellation and the symbol mapping process can be represented as:

$$x = \frac{1}{\sqrt{C}}\{(1-2d_0^F)p[4-(1-2d_2^F)[2-q(1-2d_0^N)]] +$$
$$j(1-2d_1^F)p[4-(1-2d_3^F)[2-q(1-2d_1^N)]]\};$$

when the far UE uses QPSK modulation and the near UE uses 16-QAM modulation, the result is a 64-QAM super-constellation and the symbol mapping process can be represented as:

$$x = \frac{1}{\sqrt{C}}\{(1-2d_0^F)p[4-q(1-2d_0^N)[2-(1-2d_2^N)]] +$$
$$j(1-2d_1^F)p[4-q(1-2d_1^N)[2-(1-2d_3^N)]]\};$$

when the far UE uses 16-QAM modulation and the near UE uses 16-QAM modulation, the result is a 256-QAM super-constellation and the symbol mapping process can be represented as:

$$x = \frac{1}{\sqrt{C}}\{p(1-2d_0^F)[8-(1-2d_2^F)[4-q(1-2d_0^N)[2-(1-2d_2^N)]]] +$$
$$jp(1-2d_1^F)[8-(1-2d_3^F)[4-q(1-2d_1^N)[2-(1-2d_3^N)]]]\};$$

when the far UE uses 64-QAM modulation and the near UE using QPSK modulation, the result is a 256-QAM super-constellation and the symbol mapping process can be represented as:

$$x = \frac{1}{\sqrt{C}}\{p(1-2d_0^F)[8-(1-2d_2^F)[4-(1-2d_4^F)[2-q(1-2d_0^N)]]] +$$
$$jp(1-2d_1^F)[8-(1-2d_3^F)[4-(1-2d_5^F)[2-q(1-2d_1^N)]]]\};$$

when the far UE uses QPSK modulation and a near UE uses 64-QAM modulation, the result is a 256-QAM super-constellation and the symbol mapping process can be represented as:

$$x = \frac{1}{\sqrt{C}}\{p(1-2d_0^F)[8-q(1-2d_0^N)[4-(1-2d_2^N)[2-(1-2d_4^N)]]] +$$
$$jp(1-2d_1^F)[8-q(1-2d_1^N)[4-(1-2d_3^N)[2-(1-2d_5^N)]]]\};$$

when the far UE uses 64-QAM modulation and a near UE uses 16-QAM modulation, the result is a 1024-QAM super-constellation and the symbol mapping process can be represented as:

$$x = \frac{1}{\sqrt{C}}\{p(1-2d_0^F)[16-(1-2d_2^F)[$$
$$8-(1-2d_4^F)[4-q(1-2d_0^N)[2-(1-2d_2^N)]]]] + jp(1-2d_1^F)[$$
$$16-(1-2d_3^F)[8-(1-2d_5^F)[4-q(1-2d_1^N)[2-(1-2d_2^N)]]]]\};$$

when the far UE uses 16-QAM modulation and a near UE uses 64-QAM modulation, the result is a 1024-QAM super-constellation and the symbol mapping process can be represented as:

$$x = \frac{1}{\sqrt{C}}\{p(1-2d_0^F)[16-$$
$$(1-2d_2^F)[8-q(1-2d_0^N)[4-(1-2d_2^N)[2-(1-2d_4^N)]]]] +$$
$$jp(1-2d_1^F)[16-(1-2d_3^F)[8-$$
$$q(1-2d_1^N)[4-(1-2d_3^N)[2-(1-2d_5^N)]]]]\}; \text{ and}$$

when the far UE uses 64-QAM modulation and a near UE uses 64-QAM modulation, the result is a 4096-QAM super-constellation and the symbol mapping process can be represented as:

$$x = \frac{1}{\sqrt{C}}\{p(1-2d_0^F)[32-(1-2d_3^F)[16-$$
$$(1-2d_4^F)[8-q(1-2d_0^N)[4-(1-2d_2^N)[2-(1-2d_4^N)]]]]] +$$
$$jp(1-2d_1^F)[32-(1-2d_3^F)[16-(1-2d_5^F)[$$
$$8-q(1-2d_1^N)[4-(1-2d_3^N)[2-(1-2d_5^N)]]]]]\};$$

where C is a power constraint value.

11. The method of claim 1, wherein, when the two or more UEs are a far and a near UE, the symbol mapping process can be represented as the following linear combination:

$$x = \frac{p}{\sqrt{C}}$$
$$\{ax_F + q(M(d_0^F d_2^F \ldots d_{K_F-2}^F)\text{Re}\{x_N\} + jM(d_1^F d_3^F \ldots d_{K_F-1}^F)\text{Im}\{x_N\})\},$$

where:
$X_F$ is a symbol of a far UE constellation,
$x_N$ is a symbol of a near UE constellation,
C is a power constraint value,
$M(\bullet)$ is a function taking only values of +1 and −1,
a is a constant that depends on far and near UE's modulation orders,
$K_F$ is a number of bits allocated to the far UE,
$d_1^F d_3^F \ldots d_{K_F-1}^F$ are odd bits in $x_F$, and
$d_0^F d_2^F \ldots d_{K_F-2}^F$ are even bits in $x_F$.

12. The method of claim 11, wherein the $M(\bullet)$ function is as follows:

| "Far" UE constellation ($2^{K_F}$)-QAM | "Near" UE constellation ($2^{K_N}$)-QAM | Resulting "Super-constellation" ($2^{K_F+K_N}$)-QAM | a | $M(d_0 d_1 \ldots d_{K-1})$ |
|---|---|---|---|---|
| QPSK | QPSK | 16-QAM | 2 | −(1 − 2 $d_0$) |
| 16-QAM | QPSK | 64-QAM | 2 | (1 − 2$d_0$)(1 − 2$d_1$) |
| QPSK | 16-QAM | 64-QAM | 4 | −(1 − 2$d_0$) |
| 16-QAM | 16-QAM | 256-QAM | 4 | (1 − 2$d_0$)(1 − 2$d_1$) |
| 64-QAM | QPSK | 256-QAM | 2 | −(1 − 2$d_0$)(1 − 2$d_1$)(1 − 2$d_2$) |
| QPSK | 64-QAM | 256-QAM | 8 | −(1 − 2$d_0$) |
| 64-QAM | 16-QAM | 1024-QAM | 4 | −(1 − 2$d_0$)(1 − 2$d_1$)(1 − 2$d_2$) |
| 16-QAM | 64-QAM | 1024-QAM | 8 | (1 − 2$d_0$)(1 − 2$d_1$) |
| 64-QAM | 64-QAM | 4096-QAM. | 8 | −(1 − 2$d_0$)(1 − 2$d_1$)(1 − 2$d_2$) |

13. The method of claim 1, wherein, when the two or more UEs are a far and a near UE, the symbol mapping process can be represented as the following linear combination:

$$x = \frac{p}{\sqrt{C}}\{ax_F + qx'_N\},$$

where:
- $x_F$ is a symbol of a far UE constellation,
- $C$ is a power constraint value,
- $a$ is a constant that depends on far and near UE's modulation orders, and
- $x'_N$ is an M-QAM constellation that corresponds to a bit sequence $\{c_0, c_1, \ldots c_{K_F-1}\}$, where:

$$\{c_0, c_2, \ldots, c_{K_F-2}\} = \{e_0 \oplus d_0^N, e_0 \oplus d_2^N, \ldots, e_0 \oplus d_{K_F-2}^N\}$$

$$\{c_1, c_3, \ldots, c_{K_F-1}\} = \{e_1 \oplus d_1^N, e_1 \oplus d_3^N, \ldots, e_1 \oplus d_{K_F-1}^N\}$$

and $$e_0 = N(d_0^F, d_2^F, \ldots, d_{K_F-2}^F)$$

$$e_1 = N(d_1^F, d_3^F, \ldots, d_{K_F-1}^F), \text{ and}$$

$N(\bullet)$ is function taking only binary values of 0 and 1.

14. The method of claim 13, wherein the $N(\bullet)$ function is as follows:

| "Far" UE constellation ($2^{K_F}$)-QAM | "Near" UE constellation ($2^{K_N}$)-QAM | Resulting "Super-constellation" ($2^{K_F+K_N}$)-QAM | a | $N(d_0 d_1 \ldots d_{K-1})$ |
|---|---|---|---|---|
| QPSK | QPSK | 16-QAM | 2 | $1 \oplus d_0$ |
| 16-QAM | QPSK | 64-QAM | 2 | $d_0 \oplus d_1$ |
| QPSK | 16-QAM | 64-QAM | 4 | $1 \oplus d_1$ |
| 16-QAM | 16-QAM | 256-QAM | 4 | $d_0 \oplus d_1$ |
| 64-QAM | QPSK | 256-QAM | 2 | $1 \oplus d_0 \oplus d_1 \oplus d_2$ |
| QPSK | 64-QAM | 256-QAM | 8 | $1 \oplus d_0$ |
| 64-QAM | 16-QAM | 1024-QAM | 4 | $1 \oplus d_0 \oplus d_1 \oplus d_2$ |
| 16-QAM | 64-QAM | 1024-QAM | 8 | $d_0 \oplus d_1$ |
| 64-QAM | 64-QAM | 4096-QAM | 8 | $1 \oplus d_0 \oplus d_1 \oplus d_2$. |

15. The method of claim 1, wherein the two or more UEs comprise K number of UEs and determining which type of super-constellation to generate is based at least on values of $\alpha_0, \alpha_1, \alpha_2, \ldots, \alpha_{K-1}$, where $\alpha_i$ is the transmission power allocated to $UE_i$, and $\alpha_1 + \alpha_2 + \ldots + \alpha_{K-1} = 1$.

16. The method of claim 15, wherein which type of super-constellation to generate is determined based at least on whether one or more values of $\alpha_0, \alpha_1, \alpha_2, \ldots, \alpha_{K-1}$ being greater than, equal to, or less than a threshold.

17. The method of claim 15, wherein which type of super-constellation to generate is determined based at least on whether one or more values of $\alpha_0, \alpha_1, \alpha_2, \ldots, \alpha_{K-1}$ fall within one or more range of values.

18. An apparatus for selecting a superposition constellation comprising constellations of two or more user equipments (UEs), comprising:
at least one non-transitory computer-readable medium storing instructions capable of execution by a processor; and
at least one processor capable of executing instructions stored on the at least one non-transitory computer-readable medium, where the execution of the instructions results in the apparatus performing a method comprising:
determining which type of superposition constellation (super-constellation) to generate based at least on a power ratio among the two or more UEs, wherein one type of super-constellation is a Gray-mapped Non-uniform-capable Constellation (GNC), in which both the constituent constellations of the two or more UEs and a GNC super-constellation itself are Gray-mapped; and
generating the determined type of superposition constellation,
wherein the determined type of superposition constellation is the GNC super-constellation,
wherein generating the GNC super-constellation comprises mapping symbols in accordance with parameters p and q, which are positive real-valued numbers, of the super-constellation,
wherein q is inserted into a symbol mapping equation for the super-constellation symbols and is used to maintain a target power split between the two or more UEs, and
wherein p relates to unit constellation power and is applied to both a real part and an imaginary part of the symbol mapping equation for the super-constellation symbols.

19. The apparatus of claim 18, wherein the values of p and q are constrained by the constituent constellations of the two or more UEs and a superposition environment of the super-constellation.

20. The apparatus of claim 18, wherein when p=q=1, distances between the super-constellation points are uniform.

* * * * *